US012495266B2

(12) United States Patent
Torres et al.

(10) Patent No.: US 12,495,266 B2
(45) Date of Patent: Dec. 9, 2025

(54) SYSTEMS AND METHODS FOR SOUND SOURCE VIRTUALIZATION

(71) Applicant: Bose Corporation, Framingham, MA (US)

(72) Inventors: Wade P. Torres, Attleboro, MA (US); Daniel R. Tengelsen, Framingham, MA (US); Mikaela A. Shannon, Brookline, MA (US); Cedrik Bacon, Ashland, MA (US); Carl Jensen, Waltham, MA (US); Eric Raczka Bernstein, Cambridge, MA (US)

(73) Assignee: Bose Corporation, Framingham, MA (US)

( * ) Notice: Subject to any disclaimer, the term of this patent is extended or adjusted under 35 U.S.C. 154(b) by 219 days.

(21) Appl. No.: 18/173,606

(22) Filed: Feb. 23, 2023

(65) Prior Publication Data

US 2023/0209295 A1 Jun. 29, 2023

Related U.S. Application Data

(63) Continuation of application No. 16/592,454, filed on Oct. 3, 2019, now Pat. No. 11,617,050, which is a (Continued)

(51) Int. Cl.
*H04S 7/00* (2006.01)
*H04R 5/02* (2006.01)
(Continued)

(52) U.S. Cl.
CPC ............... *H04S 7/303* (2013.01); *H04R 5/02* (2013.01); *H04R 5/04* (2013.01); *H04S 3/008* (2013.01);
(Continued)

(58) Field of Classification Search
CPC .. H04S 7/303; H04S 2400/01; H04S 2400/11; H04S 2420/01; H04S 3/008; H04R 5/02; H04R 5/04
See application file for complete search history.

(56) References Cited

U.S. PATENT DOCUMENTS 6,446,002 B1 9/2002 Barton
7,305,097 B2 12/2007 Rosen et al.
(Continued)

FOREIGN PATENT DOCUMENTS

CN 115735363 A 3/2023
JP 2010147529 A 7/2010
(Continued)

OTHER PUBLICATIONS

Tajik et al., U.S. Appl. No. 62/631,418, filed 2018.*
(Continued)

*Primary Examiner* — James K Mooney
(74) *Attorney, Agent, or Firm* — Bond, Schoeneck & King, PLLC

(57) ABSTRACT

A system and method for externalizing sound. The system includes a headphone assembly and a localizer configured to collect information related to a location of the user and of an acoustically reflective surface in the environment. A controller is configured to determine a location of at least one virtual sound source, and generate head related transfer functions that simulate characteristics of sound from the virtual sound source directly to the user and to the user via a reflection by the reflective surface. A signal processing assembly is configured to create one or more output signals by filtering the sound signal respectively with the HRTFs. Each speaker of the headphone assembly is configured to produce sound in accordance with the output signal.

16 Claims, 13 Drawing Sheets

Related U.S. Application Data continuation-in-part of application No. 15/945,449, filed on Apr. 4, 2018, now abandoned.

(51) Int. Cl.
*H04R 5/04* (2006.01)
*H04S 3/00* (2006.01)

(52) U.S. Cl.
CPC ....... *H04S 2400/01* (2013.01); *H04S 2400/11* (2013.01); *H04S 2420/01* (2013.01)

(56) References Cited

U.S. PATENT DOCUMENTS

| | | | |
|---|---|---|---|
| 7,630,500 | B1 | 12/2009 | Beckman et al. |
| 8,325,936 | B2 | 12/2012 | Eichfeld et al. |
| 9,066,191 | B2 | 6/2015 | Strauss et al. |
| 9,075,127 | B2 | 7/2015 | Hess et al. |
| 9,215,545 | B2 | 12/2015 | Dublin et al. |
| 9,352,701 | B2 | 5/2016 | Vautin et al. |
| 9,445,197 | B2 | 9/2016 | Oswald et al. |
| 9,571,925 | B1 | 2/2017 | Adva Fish |
| 9,674,630 | B2 | 6/2017 | Mateos Sole et al. |
| 9,706,327 | B2 | 7/2017 | Brannmark et al. |
| 9,743,187 | B2 | 8/2017 | Bender |
| 9,913,065 | B2 | 3/2018 | Vautin et al. |
| 9,955,261 | B2 | 4/2018 | Ojala et al. |
| 10,056,068 | B2 | 8/2018 | Oswald et al. |
| 10,057,679 | B2 | 8/2018 | Fish |
| 10,123,145 | B2 | 11/2018 | Vautin et al. |
| 10,694,286 | B2 | 6/2020 | Fish |
| 10,694,313 | B2 | 6/2020 | Zilberman et al. |
| 10,721,521 | B1 | 7/2020 | Robinson et al. |
| 10,812,926 | B2 | 10/2020 | Asada et al. |
| 11,202,137 | B1 | 12/2021 | Kemmerer et al. |
| 2005/0190936 | A1 | 9/2005 | Miura |
| 2007/0160217 | A1 * | 7/2007 | Chun ........................ H04S 3/00 381/1 |
| 2008/0008342 | A1 | 1/2008 | Sauk |
| 2008/0101589 | A1 | 5/2008 | Horowitz et al. |
| 2008/0170730 | A1 | 7/2008 | Azizi et al. |
| 2008/0273708 | A1 | 11/2008 | Sandgren et al. |
| 2008/0273722 | A1 | 11/2008 | Aylward et al. |
| 2008/0273724 | A1 | 11/2008 | Hartung et al. |
| 2008/0304677 | A1 | 12/2008 | Abolfathi et al. |
| 2009/0046864 | A1 | 2/2009 | Mahabub et al. |
| 2009/0214045 | A1 | 8/2009 | Fukui et al. |
| 2010/0032946 | A1 | 2/2010 | Begley et al. |
| 2010/0226499 | A1 | 9/2010 | De Bruijn et al. |
| 2012/0008806 | A1 | 1/2012 | Hess |
| 2012/0070005 | A1 | 3/2012 | Inou et al. |
| 2012/0093320 | A1 | 4/2012 | Flaks et al. |
| 2012/0140945 | A1 | 6/2012 | Harris |
| 2013/0041648 | A1 | 2/2013 | Osman |
| 2013/0121515 | A1 | 5/2013 | Hooley et al. |
| 2013/0194164 | A1 | 8/2013 | Sugden et al. |
| 2014/0153751 | A1 | 6/2014 | Wells |
| 2014/0198918 | A1 | 7/2014 | Li et al. |
| 2014/0314256 | A1 | 10/2014 | Fincham et al. |
| 2014/0334637 | A1 | 11/2014 | Oswald et al. |
| 2015/0092965 | A1 | 4/2015 | Umminger et al. |
| 2015/0119130 | A1 | 4/2015 | Lovitt |
| 2015/0208166 | A1 | 7/2015 | Raghuvanshi et al. |
| 2016/0100250 | A1 | 4/2016 | Baskin et al. |
| 2016/0140949 | A1 | 5/2016 | Fan et al. |
| 2016/0286316 | A1 | 9/2016 | Bleacher et al. |
| 2016/0360224 | A1 | 12/2016 | Laroche et al. |
| 2016/0360334 | A1 | 12/2016 | Wu et al. |
| 2017/0078820 | A1 | 3/2017 | Brandenburg et al. |
| 2017/0085990 | A1 | 3/2017 | Sladeczek et al. |
| 2017/0230749 | A1 | 8/2017 | Fish |
| 2017/0272890 | A1 | 9/2017 | Oh |
| 2017/0325043 | A1 | 11/2017 | Jot |
| 2018/0020312 | A1 | 1/2018 | Visser et al. |
| 2018/0077514 | A1 | 3/2018 | Lee et al. |
| 2018/0091922 | A1 | 3/2018 | Satongar et al. |
| 2018/0124513 | A1 | 5/2018 | Kim et al. |
| 2018/0146290 | A1 | 5/2018 | Christoph et al. |
| 2018/0220253 | A1 | 8/2018 | Kärkkäinen et al. |
| 2018/0232471 | A1 | 8/2018 | Schissler et al. |
| 2019/0037334 | A1 | 1/2019 | Acharya |
| 2019/0058943 | A1 | 2/2019 | Fish |
| 2019/0104363 | A1 | 4/2019 | Vautin et al. |
| 2019/0187244 | A1 | 6/2019 | Riccardi et al. |
| 2019/0313201 | A1 | 10/2019 | Torres et al. |
| 2019/0357000 | A1 | 11/2019 | Karkkainen et al. |
| 2020/0037097 | A1 | 1/2020 | Torres et al. |
| 2020/0107147 | A1 | 4/2020 | Munoz et al. |
| 2020/0275207 | A1 | 8/2020 | Zilberman et al. |
| 2020/0413213 | A1 | 12/2020 | Konagai |
| 2021/0058730 | A1 * | 2/2021 | Raghuvanshi .......... H04S 7/306 |
| 2021/0084357 | A1 * | 3/2021 | Tajik .................... H04N 21/439 |
| 2021/0400417 | A1 | 12/2021 | Freeman et al. |
| 2022/0082688 | A1 | 3/2022 | Torres |
| 2023/0089225 | A1 | 3/2023 | Wang |

FOREIGN PATENT DOCUMENTS

| | | | |
|---|---|---|---|
| JP | 2013535861 | A | 9/2013 |
| JP | 2015050493 | A | 3/2015 |
| JP | 2020515959 | A | 5/2020 |
| WO | 2013061268 | A2 | 5/2013 |
| WO | 2018127901 | A1 | 7/2018 |
| WO | 2020035335 | A1 | 2/2020 |
| WO | 2021258102 | A1 | 12/2021 |
| WO | 2022061342 | A2 | 3/2022 |

OTHER PUBLICATIONS

International Preliminary Report on Patentability, International Patent Application No. PCT/US2021/0071464, pp. 1-13, dated Mar. 30, 2023.

The International Search Report and the Written Opinion of the International Searching Authority, International Patent Application No. PCT/US2021/072012, pp. 1-14, dated Feb. 11, 2022.

The International Search Report and the Written Opinion of the International Searching Authority, International Patent Application No. PCT/US2021/072072, pp. 1-13, dated Mar. 10, 2022.

The International Search Report and the Written Opinion of the International Searching Authority, International Patent Application No. PCT/US2021/070709, pp. 1-11, dated Oct. 5, 2021.

The International Search Report and the Written Opinion of the International Searching Authority, International Patent Application No. PCT/US2021/071464, pp. 1-19, dated Feb. 24, 2022.

International Preliminary Report On Patentability, International Patent Application No. PCT/US2020/053068, pp. 1-11, dated Apr. 5, 2022.

Vera Erbes et al: "Extending the closed-form image source model for source directivity (Digital appendix)", Proceedings Daga 2018 Munich, Mar. 22, 2018 (Mar. 22, 2018), pp. 1298-1301, XP055685529, doi: 10.14279/depositonce-6724.

International Search Report and the Written Opinion of the International Searching Authority, International Patent Application No. PCT/US2020/053068, pp. 1-15, dated Dec. 4, 2020.

"Omnidirectional." , Sweetwater, Nov. 3, 1997, www.sweetwater.com/insync/omnidirectional/#:-:text=Speakers%20are% 20omnidirectional %20if%20they,beam% E2%80%9 D%20or%20be%20very% 20directional. (Year: 1997).

International Search Report and the Written Opinion of the International Searching Authority, International Application No. PCT/US2019/024618, pp. 1-15, dated Jun. 19, 2019.

Jot et al.; Augmented Reality Headphone Environment Rendering; Audio Engineering Society Conference Paper; 2016; pp. 1-6.

Non-Final Office Action, U.S. Appl. No. 18/408,051, dated Dec. 13, 2024, pp. 1-11.

The First Office Action, Japanese Patent Application No. 2022-577723, dated Mar. 19, 2024, pp. 1-10, with pp. 1-5 being a translation.

(56) References Cited

OTHER PUBLICATIONS

Final Office Action, U.S. Appl. No. 18/408,051, dated Apr. 11, 2025, pp. 1-15.
Communication Pursuant To Article 94(3) EPC, European Patent Application No. 21739890.8, dated Nov. 15, 2024, pp. 1-7.
International Preliminary Report On Patentability, International Patent Application No. PCT/US2020/070709, pp. 1-7, dated Dec. 13, 2022.
The Second Office Action, Japan Patent Application No. 2022-577723, dated Aug. 28, 2024, pp. 1-10, with pp. 1-5 being a translation.

* cited by examiner

SYSTEMS AND METHODS FOR SOUND SOURCE VIRTUALIZATION

CROSS-REFERENCE TO RELATED APPLICATIONS

The present Application is a Continuation of U.S. patent application Ser. No. 16/592,454 filed on Oct. 3, 2019, which is a Continuation-in-Part of U.S. patent application Ser. No. 15/945,449 filed on Apr. 4, 2018, which applications are herein incorporated by reference in their entireties.

BACKGROUND

The disclosure relates to methods, devices, and systems for using sound externalization over headphones to augment reality.

SUMMARY

All examples and features mentioned below can be combined in any technically possible way.

The present disclosure describes various systems and methods for sound source virtualization. When listening to audio content over near-field speaker systems, such as headphones, particularly stereo headphones, many listeners perceive the sound as coming from "inside their head". Sound virtualization refers to the process of making sounds that are rendered over such systems sound as though they are coming from the surrounding environment, i.e. the sounds are "external" to the listener, which may be referred to herein as headphone externalization or sound externalization, additionally, the terms 'externalization' and virtualization' may be used interchangeably herein. Alternately stated, the sounds may be perceived by the listener as coming from a virtual source. A combination of head tracking and the use of head related transfer functions (HRTFs) can be used to give the listener cues that help them perceive the sound as though it were coming from "outside their head". The present disclosure appreciably recognizes that additional cues may be added that are consistent with the listener's surroundings to significantly improve the perceived externalization. More specifically, a radiation pattern of a virtual sound source and reflections from acoustically reflective surfaces such as the walls, ceiling, floor, and other objects in the room may be synthetically generated and appropriately filtered with corresponding HRTFs that are consistent with respect to the direction of arrival of direct and reflected audio signals.

In one example, a method for virtualizing sound from a speaker assembly proximate to a user is provided, the method including: receiving an audio signal associated with a first virtual sound source; receiving a virtual sound source location of the first virtual sound source; receiving a virtual sound source orientation of the first virtual sound source; adjusting the audio signal based at least in part on a radiation pattern characteristic of the first virtual sound source; adjusting the audio signal based at least in part on a head related transfer function (HRTF); and providing the adjusted audio signal at an output, the output adjusted audio signal to be provided to the speaker assembly for conversion into acoustic energy delivered to at least one of the user's ears.

In one aspect, the method further includes adjusting the audio signal based at least in part on an acoustically reflective characteristic of an acoustically reflective surface in proximity to the first virtual sound source.

In one aspect, the acoustically reflective characteristic is frequency dependent.

In one aspect, the radiation pattern characteristic includes a directional characteristic.

In one aspect, the radiation pattern characteristic includes a reflected directional characteristic based at least in part on a mirror sound source location selected based at least in part on the first virtual sound source location and a location of the acoustically reflective surface.

In one example, a method for virtualizing sound from a speaker assembly proximate a user is provided, the method including: associating a first virtual sound source with a first physical location in an environment in which the user is located; identifying one or more acoustically reflective surfaces at a second physical location in the environment; and simulating either a first direct sound from the first virtual audio source or a first primary reflected sound from the first virtual audio source off of a first reflective surface of the one or more reflective surfaces within the environment, wherein the simulated first direct sound or the simulated first primary reflected sound from the first virtual sound source includes a first directional characteristic.

In one aspect, the first directional characteristic is frequency dependent.

In one aspect, the step of simulating the first direct sound from the first virtual sound source or simulating the first primary reflected sound off of the first reflective surface of the one or more reflective surfaces further includes: generating a first left Head Related Transfer Function (HRTF) and a first right HRTF, arranged to simulate the first direct sound to the left ear of the user and right ear of the user, respectively, or to simulate the first primary reflected sound to the left ear of the user and the right ear of the user, respectively.

In one aspect, the method further includes simulating a first secondary reflected sound off of a second reflective surface of the one or more reflective surfaces.

In one aspect, the step of simulating the first secondary reflected sound off of the second reflective surface of the one or more reflective surfaces includes: generating a second left Head Related Transfer Function (HRTF) and a second right HTRF, arranged to simulate the first secondary reflected sound to the left ear of the user and right ear of the user, respectively.

In one aspect, the method further includes: associating a second virtual sound source with a third physical location in the environment; and simulating either a second direct sound from the second virtual audio source or a second primary reflected sound from the second virtual audio source off of the first reflective surface of the one or more reflective surfaces within the environment, wherein the simulated second direct sound or the simulated second primary reflected sound from the second virtual sound source includes a second directional characteristic.

In one aspect, the step of simulating the second direct sound from the second virtual sound source or simulating the second primary reflected sound off of the first reflective surface of the one or more reflective surfaces further includes: generating a third left Head Related Transfer Function (HRTF) and a third right HTRF, arranged to simulate the second direct sound to the left ear of the user and right ear of the user, respectively, or to simulate the second primary reflected sound to the left ear of the user and the right ear of the user, respectively.

In one aspect, the method further includes simulating a second secondary reflected sound off of the second reflective surface of the one or more reflective surfaces.

In one aspect, the step of simulating the second secondary reflected sound off of the second reflective surface of the one or more reflective surfaces includes: generating a fourth left Head Related Transfer Function (HRTF) and a fourth right HTRF, arranged to simulate the second secondary reflected sound to the left ear of the user and right ear of the user, respectively.

In one example, a binaural sound virtualization system is provided, the binaural sound virtualization system including a memory and a processor coupled to the memory, the processor configured to: receive an audio signal, receive location information about a virtual sound source, receive orientation information about the virtual sound source, process the audio signal into a left signal and a right signal, each of the left signal and the right signal configured to cause a user to perceive the audio signal as virtually coming from the virtual sound source located and oriented in accord with the location information and the orientation information, upon acoustically rendering the left signal to the user's left ear and the right signal to the user's right ear, and an output coupled to the processor and configured to provide the left signal and the right signal to an audio rendering device.

In one aspect, the processing of the audio signal causes a user to perceive the audio signal as virtually coming from the virtual sound source located and oriented in accord with the location information and the orientation information includes applying a radiation pattern associated with the orientation information.

In one aspect, the radiation pattern associated with the orientation information is reflected off one or more acoustically reflective surfaces, wherein the one or more acoustically reflective surfaces are selected from: a wall, a floor, or a ceiling within the environment.

In one aspect, the binaural sound virtualization system further includes a display configured to display an avatar representing the virtual sound source, wherein the display is arranged on a smartphone or other mobile computing device.

In one aspect, the binaural sound virtualization system further includes a motion tracker configured to collect data related to an orientation of the user.

In one example, a binaural sound virtualization system is provided, the binaural sound virtualization system including: an input to receive an audio signal; a first output to provide a first output signal to be acoustically rendered to a user's left ear; a second output to provide a second output signal to be acoustically rendered to a user's right ear; and a processor coupled to the input, the first output, and the second output, the processor configured to receive the audio signal and adjust the audio signal to generate each of the first output signal and the second output signal to virtualize the audio signal to be perceived as coming from a virtual sound source, the processor further configured to account for a radiation pattern of the virtual sound source in adjusting the audio signal to generate each of the first output signal and the second output signal.

These and other aspects of the various embodiments will be apparent from and elucidated with reference to the aspect(s) described hereinafter.

DETAILED DESCRIPTION

Figure 1:
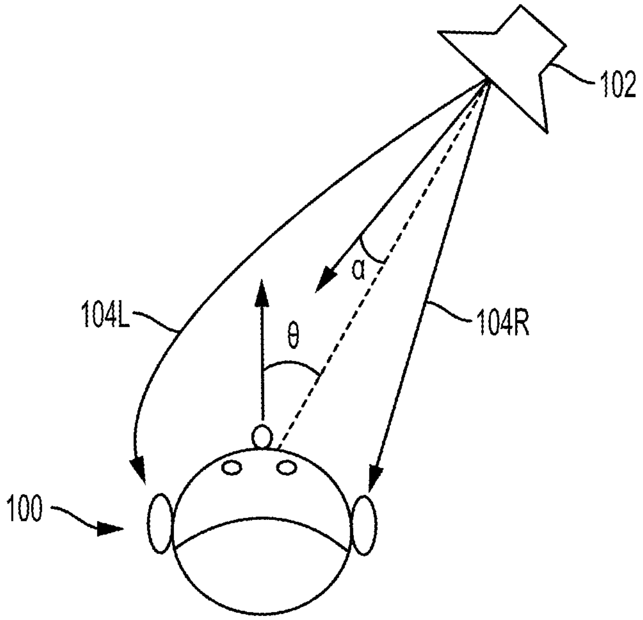
FIG. 1 is a schematic view illustrating head related transfer functions characterizing sound received by a user.

The present disclosure describes various systems and methods for sound source virtualization to cause a perceived source location of sound to be from a location external to a set of speakers proximate a user's ears. By controlling audio signals delivered to each of a user's left and right ears, such as by headphones, a source location of the sound may be virtualized to be perceived to come from elsewhere within an acoustic space, such as a room, vehicle cabin, etc. When listening to audio over headphones, particularly stereo (binaural) headphones, many listeners perceive the sound as coming from "inside their head". Headphone externalization refers to the process of making sounds that are rendered over headphones sound as though they are coming from the surrounding environment, i.e. the sounds are "external" to the listener. The combination of head tracking and the use of head related transfer functions (HRTFs) can be used to give the listener some cues that help them perceive the sound as though it were coming from "outside their head". The present disclosure appreciably recognizes that additional cues may be added that are consistent with the listener's surroundings to significantly improve the perceived externalization. More specifically, reflections off of acoustically reflective surfaces such as the walls, ceiling, floor, and other objects in the room may be synthetically generated and appropriately filtered with the corresponding HRTF that is consistent with respect to the reflection's direction of arrival. Similarly, a virtual direct acoustic signal may be generated from a source audio signal by filtering with an HRTF corresponding to the direction of arrival of the direct signal. In various examples, each of the direct and reflected signals may be adjusted to account for a radiation pattern associated with a virtual sound source, e.g., accounting for a virtual orientation of the virtual sound source.

To this end, the location and orientation of the listener in the room or environment, the location and orientation of the virtual sound source, and the location of any acoustically reflective surfaces (typically walls, ceiling, floor, etc.) is determined. This information can be ascertained, for example, via active scanning or monitoring by one or more sensors, cameras, or other means. In some examples, this information may be obtained by manually measuring an area and creating a corresponding digital map, or model, of the environment. By dynamically and continually updating sensor information about the environment, a system can be created that virtualizes sound no matter where the listener is and even as the listener moves around the environment.

In various examples, the concepts disclosed herein may be extended to multiple virtual sound sources, e.g., to a virtual stereo pair of speakers or a virtual multi-channel sound system, such as a surround sound system, as will be discussed below in detail.

The term "head related transfer function" or acronym "HRTF" is intended to be used broadly herein to reflect any manner of calculating, determining, or approximating head related transfer functions. For example, a head related transfer function as referred to herein may be generated or selected specific to each user, e.g., taking into account that user's unique physiology (e.g., size and shape of the head, ears, nasal cavity, oral cavity, etc.). Alternatively, a generalized head related transfer function may be generated or selected that is applied to all users, or a plurality of generalized head related transfer functions may be generated that are applied to subsets of users (e.g., based on certain physiological characteristics that are at least loosely indicative of that user's unique head related transfer function, such as age, gender, head size, ear size, or other parameters). In one embodiment, certain aspects of the head related transfer function may be accurately determined, while other aspects are roughly approximated (e.g., accurately determines the inter-aural delays, but coarsely determines the magnitude response). In various examples, a number of HRTF's may be stored, e.g., in a memory, and selected for use relative to a determined angle of arrival of a virtual acoustic signal.

The term "headphone" as used herein is intended to mean any sound producing device that is configured to provide acoustic energy to each of a user's left and right ears, and to provide some isolation or control over what arrives at each ear without being heard at the opposing ear. Such devices often fit around, on, in, or proximate to a user's ears in order to radiate acoustic energy into the user's ear canal. Headphones may be referred to as earphones, earpieces, earbuds, or ear cups, and can be wired or wireless. Headphones may be integrated into another wearable device, such as a headset, helmet, hat, hood, smart glasses or clothing, etc. The term "headphone" as used herein is also intended to include other form factors capable of providing binaural acoustic energy, such as headrest speakers in an automobile or other vehicle. Further examples include neck-worn devices, eyewear, or other structures, such as may hook around the ear or otherwise configured to be positioned proximate a user's ears. Accordingly, various examples may include open-ear forms as well as over-ear or around-ear forms. A headphone may include an acoustic driver to transduce audio signals to acoustic energy. The acoustic driver may be housed in an ear cup or earbud, or may be open-ear, or may be associated with other structures as described, such as a headrest. A headphone may be a single stand-alone unit or one of a pair of headphones, such as one headphone for each ear.

The term "augmented reality" or acronym "AR" as used herein is intended to include systems in which a user may encounter, with one or more of their senses (e.g., using their sense of sound, sight, touch, etc.), elements from the physical, real-world environment around the user that have been combined, overlaid, or otherwise augmented with one or more computer-generated elements that are perceivable to the user using the same or different sensory modalities (e.g., sound, sight, haptic feedback, etc.). The term "virtual" as used herein refers to this type of computer-generated augmentation that is produced by the systems and methods disclosed herein. In this way, a "virtual sound source" as referred to herein corresponds to a physical location in the real-world environment surrounding a user which is treated as a location from which sound radiates, but at which no sound is actually produced by an object. In other words, the systems and methods disclosed herein may simulate a virtual sound source as if it were a real object producing a sound at the corresponding location in the real world. In contrast, the term "real", such as "real object", refers to things, e.g., objects, which actually exist as physical manifestations in the real-world area or environment surrounding the user.

FIG. 1 schematically illustrates a user 100 receiving sound from a sound source 102. As noted above, HRTFs can be calculated that characterize how the user 100 receives sound from the sound source, and are represented by arrows as a left HRTF 104L and a right HRTF 104R (collectively or generally HRTFs 104). The HRTFs 104 are at least partially defined based on an orientation of the user with respect to an arriving acoustic wave emanating from the sound source, indicated by an angle $\theta$. That is, the angle $\theta$ represents the relation between the direction that the user 100 is facing with respect to the direction from which the sound arrives (represented by a dashed line). A directionality of the sound produced by the sound source 102 may be defined by a radiation pattern, which varies with the angle $\alpha$, that represents the relation between the primary (or axial) direction in which the sound source 102 is producing sound and the direction to which the user 100 is located.

Figure 2:
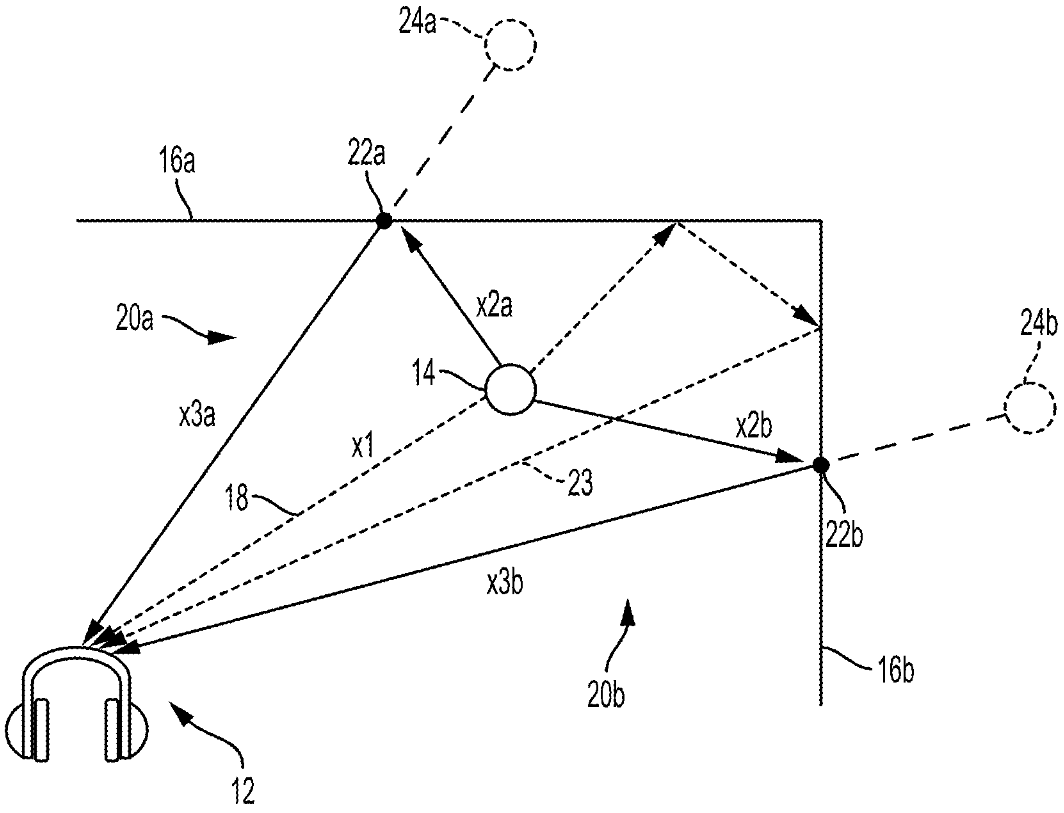
FIG. 2 is a schematic view illustrating direct and reflected sound paths from a virtual sound source to a headphone assembly in a sound externalization system according to the present disclosure.

FIG. 2 depicts a sound externalization system 10 that includes a headphone assembly 12, e.g., including a first speaker configured to be arranged with respect to a user's left ear and/or a right speaker configured to be arranged with respect to a user's right ear. As discussed herein, the sound externalization system 10 may be used with or as an augmented reality system, specifically, to create acoustic augmentations to reality. The system 10 is configured to set, obtain, or generate a physical location for a virtual sound source 14. That is, despite the virtual sound source 14 being virtual, i.e., a computer-generated construct that does not exist in the real world, a physical location in the real world is associated with the virtual sound source 14. In this way, the system 10 is able to produce sound for the user that simulates the sound for the user as if the virtual sound source 14 were a physical object in the real world producing the sound. The system 10 utilizes the location corresponding to the virtual sound source 14 and the location and orientation of the user's head (e.g., of the headphone assembly 12) to determine head related transfer functions (HRTFs) to simulate how the user would have heard the sound produced by the virtual sound source 14 if the virtual sound source 14 were a physical object in the real world. In various examples, HRTFs may be calculated or generated by various means or may be stored in a memory and selected therefrom based upon, for example, a simulated direction of arrival of acoustic energy.

It is to be appreciated that the location associated with the virtual sound source 14 may be an empty space in the real-world environment, or occupied by a real object. In either event, the system 10 simulates a sound signal that is perceived by the user as originating from the designated location without that sound being actually produced by the environment or an object at that location. If a visual augmentation device is used as part of the system 10 (such as via a head mounted display or the display of a smartphone or other mobile computing device, as discussed in more detail with respect to FIG. 5), the system 10 may be arranged to create a virtual avatar as a visual augmentation that is associated with, and/or represents, the virtual sound source 14. As one particular non-limiting example, if the virtual sound source 14 includes speech, a virtual avatar (e.g., image, animation, three-dimensional model, etc.) of a person talking may be used to represent the virtual sound source 14.

The system 10 also determines a location of the headphone assembly 12, the user wearing the headphone assembly 12, and one or more real objects in the environment surrounding the user, such as a wall 16*a* or 16*b* in FIG. 2. The reference numeral 16 may be used herein to refer generally to the various embodiments of the acoustically reflective objects or surfaces (e.g., the "object 16" or "reflective object 16"), with alphabetic suffixes (e.g., 'a', 'b') utilized to identify specific instances or examples for the object 16. Similar alphabetic suffixes may be used in a similar manner with respect to other components, features, or elements discussed herein. While the walls 16*a* and 16*b* are provided as specific examples, it is to be appreciated that any potentially acoustically reflective object in the real-world environment may be detected, modeled, or otherwise accommodated as the object 16, such as a wall, floor, ceiling, furniture, person, automobile, flora, fauna, etc. It is noted that since sound reflects off of the surfaces of objects, any reference to "objects" herein is also applicable to and intended to include surfaces of objects. It should also be appreciated that each reflective object or surface 16 can include an acoustically reflective characteristic ARC produced by a perceived material or shape of the surface or object. The acoustically reflective characteristic ARC can be selected from an attenuation response, which may be frequency dependent, and in some instances may include a phase shift response.

In one embodiment, the location of the user is determined as the location of the headphone assembly 12, or vice versa, since the user is presumably wearing the headphone assembly 12. Accordingly it should be appreciated that "location of the user" as used herein can be determined by directly identifying the location of the user, or indirectly by determining the location of some other device expected to be held, carried, or worn by the user, such as the headphone assembly 12, or a smartphone or other mobile device associated with the user.

It is to be appreciated that the locations of the user, the headphone assembly 12, the virtual sound source 14, and/or the object 16 may be determined as a global or absolute position relative to some global coordinate system, and/or as relative positions based on distances between and orientations of these entities with respect to each other. In one embodiment, relative distances and/or orientations between the entities are calculated from a global coordinate system by calculating the difference between each location. As discussed above with respect to FIG. 1, the system 10 may also determine an orientation or angle of the headphone assembly 12 and/or the virtual sound source 14 (e.g., $\alpha$ and/or $\theta$) to facilitate processing of audio signals, including the calculation, determination, or selection of HRTFs that most accurately simulate sound from the location associated with the virtual sound source 14. As one example, a user may desire to use the headphone assembly 12 so as not to disturb others with loud sound, but to set the virtual sound source at the location of their stereo speakers or other location in a room so as to simulate the sound as if it were coming from their stereo system, but without creating noise perceivable to others that are not wearing the headphone assembly 12.

Regardless of how the various locations are determined, the locations can be used to determine a distance X1 corresponding to a direct sound path 18 from the virtual sound source 14 (namely, the physical location associated with the virtual sound source 14) to the headphone assembly 12. The system 10 also uses the determined locations to further determine one or more reflected sound paths, generally referred to with the reference numeral 20. Namely, FIG. 2 illustrates a first reflected sound path 20*a* and a second reflected sound path 20*b*, although any number of reflected sound paths 20 may be used. In various examples, the system 10 can generate or select a set of left and right HRTFs for each of the direct sound path 18 and the reflected sound paths 20, for application to generate left and right signals to be provided to and rendered by the loudspeakers associated with the headphone assembly 12.

As the reflected sound paths 20 represent reflected sound, each reflected sound path 20 is simulated to include a reflection from the corresponding reflective object 16. For example, the reflection may be indicated at or by a reflection point, generally referred to with the reference numeral 22, on an acoustically reflective object in the environment. It is noted that sound from real sound sources reflects off the surface of objects, not just a single point, as illustrated and described with respect to the reflection points 22. However, since the sound produced by the virtual sound source 14 is simulated, the reflections of the sound off of the objects 16 are also simulated. For this reason, the reflection points 22 may be utilized if convenient, e.g., to simplify calculations and/or representations related to the reflected sound paths 20 or other characteristics of the reflected sound. Thus, with respect to FIG. 2, the first reflected sound path 20*a* simulates sound originating at the virtual sound source 14 and reflecting off the wall 16*a*, representatively at a reflection point 22*a*, before arriving at the user's head (represented by the headphone assembly 12). Similarly, the second reflected sound path 20*b* simulates sound originating at the virtual sound source 14 and reflecting off the wall 16*b*, representatively at a reflection point 22*b*, before arriving at the user's head.

It is to be appreciated that the reflected sound paths 20*a* and 20*b* in FIG. 2 represent first early reflections, but that secondary or higher order reflections, i.e., sounds reflecting off multiple surfaces before reaching the user's head, may also be calculated and utilized by the system 10. For example, a reflected sound path 23 shown in dotted lines in FIG. 2 may be simulated for sound originating at the location of the virtual sound source 14 that first reflects off the wall 16*a* and then reflects off the wall 16*b*, before reaching the user's head. Similarly, any number of reflections off any number of objects may be simulated according to the embodiments disclosed herein.

Each reflected sound path 20*a* and 20*b* includes a first segment having a distance X2 and a second segment having a distance X3 (thus, the sum of distances X2*a* and X3*a* defining a total length of the first sound path 20*a* and the sum of the distances X2*b* and X3*b* defining a total length of the second sound path 20*b*). It is to be appreciated that each of the reflected sound paths 20 can be analogized as a copy (generally referred to herein with the reference numeral 24) of the virtual sound source 14 mirrored (reflected) with respect to the object 16 causing that reflection. For example, in FIG. 2, a mirrored or reflected copy 24*a* of the virtual sound source 14 is shown mirrored with respect to the wall 16*a*, while a mirrored or reflected copy 24*b* of the virtual sound source 14 is shown mirrored with respect to the wall 16*b*. Via the known locations of the virtual sound source 14 and the walls 16*a* and 16*b*, the physical location corresponding to the mirrored copies 24 can be determined and the direct path from the mirrored copies 24 to the headphone assembly 12 used as an analog to the reflected sound path 20, since the segments having the lengths X2 are also mirrored. It is to be appreciated that the mirrored copies 24 may be mirrored or reflected any number of times off any number of reflective surfaces in order to simulate higher-order reflections (e.g., such as the reflected sound path 23, which represents sound reflecting off both the wall 16*a* and the wall 16*b*).

Although the description above discusses simulation of omni-directional sound produced by a virtual sound source 14 within an environment, it should be appreciated that, as discussed below with respect to FIGS. 9A-9D, each sound path, i.e., the direct sound paths, reflected sound paths, and the higher order sound paths simulated can incorporate a radiation pattern of the virtual sound source 14, as discussed in greater detail below.

Figure 3:
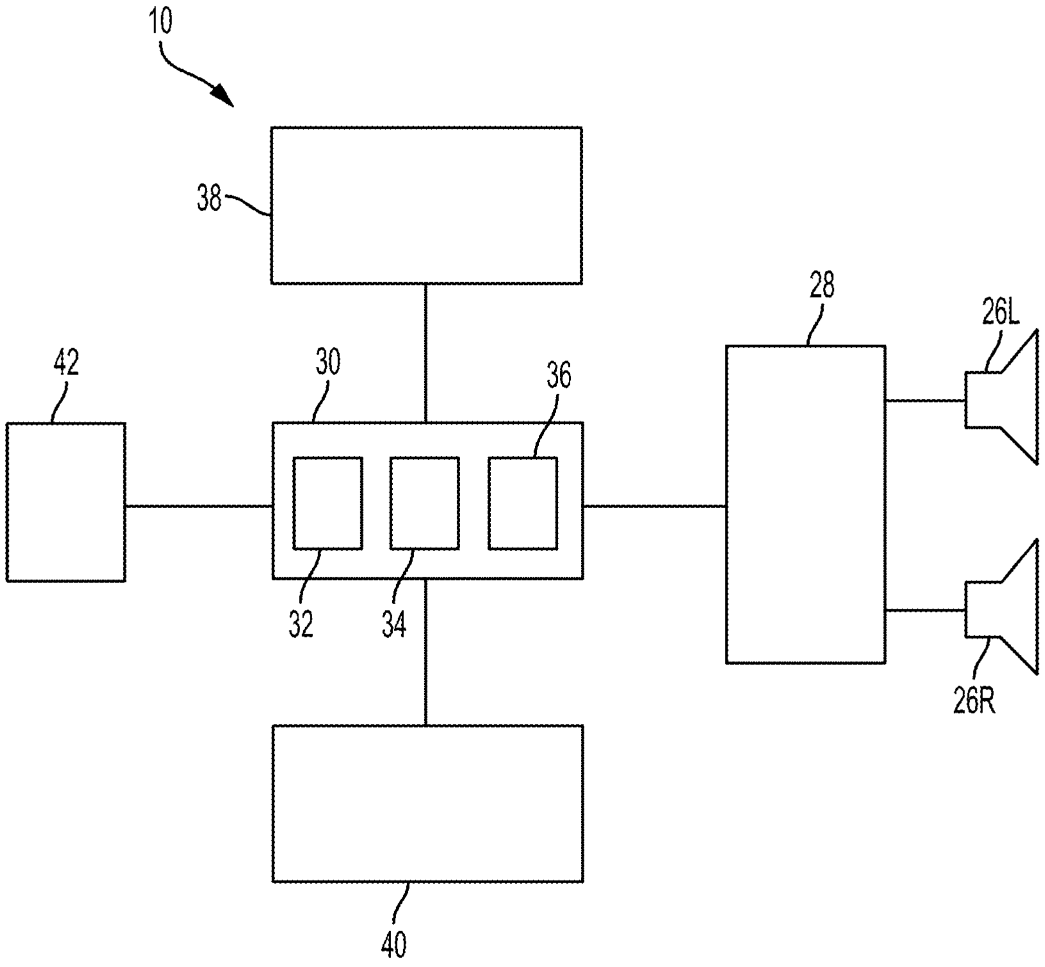
FIG. 3 is a block diagram of a sound externalization system according to the present disclosure.

One embodiment for the system 10 is shown in more detail in FIG. 3, in which the headphone assembly 12 includes a first (e.g., left) speaker 26L, and a second (e.g., right) speaker 26R, collectively or generally "the speakers 26". The speakers 26 may include any device or component configured to produce sound, such as an electro-acoustic transducer. The system 10 may also include a signal processing circuit 28, which creates an output signal for each of the speakers 26 (e.g., a left output signal for the left speaker 26L and a right output signal for the right speaker 26R). To this end, the signal processing circuit may include filters or other signal processing components for modifying a sound signal in a desired manner, such as by adjusting for a virtual radiation pattern, propagation delay, and applying one or more HRTFs. In various examples additional processing may be included, such as active noise cancellation, or some other functionality applied to a sound signal.

The sound signal processed by the signal processing circuit 28 may be generated by a controller 30. The controller 30 includes a processor 32, a memory 34, and/or a communication module 36. The processor 32 may take any suitable form, such as a microcontroller, plural microcontrollers, circuitry, a single processor, or plural processors configured to execute software instructions. The memory 34 may take any suitable form or forms, including a volatile memory, such as random access memory (RAM), or non-volatile memory such as read only memory (ROM), flash memory, a hard disk drive (HDD), a solid state drive (SSD), or other data storage media. The memory 34 may be used by the processor 32 for the temporary storage of data during its operation. Data and software, such as the algorithms or software necessary to analyze the data collected by the sensors of the system 10, an operating system, firmware, or other application, may be installed in the memory 34. The communication module 36 is arranged to enable wired or wireless signal communication between the controller 30 and each of the other components of the system 10, particularly if the components of the system 10 are implemented as one or more remote devices separate from the headphone assembly 12. The communication module 36 may be or include any module, device, or means capable of transmitting a wired or wireless signal, such as but not limited to Wi-Fi (e.g., IEEE 802.11), Bluetooth, cellular, optical, magnetic, Ethernet, fiber optic, or other technologies.

The controller 30 is configured to perform or assist in performing any of the determinations, selections, or calculations discussed herein. For example, with respect to FIG. 2, as discussed above, the controller 30 may be configured to set, obtain, or otherwise determine the location and/or orientation associated with the virtual sound source 14, as well as to generate, store, or transmit the sound signal associated with the virtual sound source 14. The controller 30 may also be used to determine the locations, orientations, and/or distances discussed with respect to FIG. 2, such as by calculating the locations and/or distances from position data (discussed in more detail below) corresponding to the user, the headphone assembly 12, the virtual sound source 14, the object 16, etc. Once the locations, orientations, and/or distances are calculated, the controller 30 may also be configured to generate or select an HRTF for each sound path—speaker combination. For example, the controller 30 can generate a first left HRTF for the left speaker 26L simulating sound from the virtual sound source 14 along the direct sound path 18, a second left HRTF for the left speaker 26L simulating sound reflected at the reflection point 22*a* from the virtual sound source 14 along the reflected sound path 20*a*, and a third left HRTF for the left speaker 26L simulating sound reflected at the reflection point 22*b* from the virtual sound source 14 along the reflected sound path 20*b*. A similar set of right HRTFs can be generated, selected, and/or applied for the user's right ear and/or the right speaker 26R corresponding to the direct path 18, the reflected sound path 20*a*, and the reflected sound path 20*b*. Additionally, left and/or right HRTFs can be made for any number of other virtual sound sources and/or reflected sound paths, including any number of higher-order reflected sound paths, in some examples.

To collect position data usable by the controller 30 to calculate the aforementioned locations, orientations, and/or distances, the system 10 may include a localizer 38. The localizer 38 includes any sensor, device, component, or technology capable of obtaining, collecting, or generating position data with respect to the location of the user, the headphone assembly 12, and the object 16, or the relative positions of these entities with respect to each other. The localizer 38 may include a rangefinder, proximity sensor, depth sensor, imaging sensor, camera, or other device. The localizer 38 may be embedded in the headphone assembly 12, or included by a remote device separate from the headphone assembly 12, such as incorporated in a mobile device, a television, an audio/video system, or other devices. For example, the localizer 38 may detect the reflective objects 16 by way of a transmitter and receiver configured to generate a signal and measure a response reflected off nearby objects, e.g., ultrasonic, infrared, or other signal. In one embodiment, the localizer 38 includes a camera, and the controller 30 includes an artificial neural network, deep learning engine, or other machine learning algorithm trained to detect the object 16 from the image data captured by the camera. In one embodiment, the localizer 38 includes a global positioning system (GPS) antenna or transponder, e.g., embedded in the headphone assembly 12 or otherwise carried by the user (such as in a smartphone). In one embodiment, the controller 30 only selects objects to be reflective objects 16 if they are within some threshold distance of the virtual sound source 14.

The system 10 may additionally include a motion tracker 40 that is configured to track motion of the user, particularly, the orientation of the user. In other words, since the HRTFs characterizing the sound received by the user at each ear is at least partially defined by the orientation of the user's ears with respect to the direction of arrival of sound, the motion tracker 40 may be used to track the location and direction in which the user's head (and/or the headphone assembly 12) is facing in order to better approximate the HRTFs for that user (and/or the speakers 26). In various examples, motion of the user may be directly tracked by various sensors, while in other examples motion of the user may be indirectly tracked by monitoring motion of the headphone assembly 12, or some other device held, carried, or worn by the user.

The motion tracker 40 may include sensors embedded into or integrated with the headphone assembly 12 to track motion of the headphone assembly 12, such as a proximity sensor utilizing ultrasonic, infrared, or other technologies, cameras, accelerometers, gyroscopes, etc. In one embodiment, the motion tracker 40 includes a nine-axis inertial motion sensor. In one embodiment, the motion tracker 40 includes at least one sensor external to the headphone assembly 12. For example, the motion tracker 40 may include a depth sensor, imaging sensor, and/or camera system for tracking one or more elements of the user and/or the headphone assembly 12. Such sensors and systems may be included in a remote device, such as a mobile device, a television, an audio/video system, or other systems. In one embodiment, the motion tracker 40 includes a tag or marker (embedded in the headphone assembly 12 and/or otherwise carried or worn by the user) that is tracked by one or more external cameras, e.g., as is commonly used to perform motion capture, or mo-cap, in the film and videogame industries.

It is to be appreciated that both the localizer 38 and the motion tracker 40 are arranged to track, monitor, or detect the relative positions of the user, the headphone assembly 12, the virtual sound source 14, and/or the object 16. In other words, the data or information collected and/or generated by localizer 38 and the motion tracker 40 can be used, e.g., by the controller 30, to determine whether relative motion has occurred between any of these entities. Accordingly, positions of each of these entities can change and the system 10 is capable of reacting accordingly and in essentially real-time. For example, as the user walks about an environment, the localizer 38 can continuously recalculate the distance between the user and the object 16, while the motion tracker 40 monitors the relative orientation of the user's head (and/or the headphone assembly 12). As another example, the controller 30 can change the location of the virtual sound source 14 at will, and the data collected by the localizer 38 and/or the motion tracker 40 used to generate direct sound paths, reflected sound paths, and HRTFs from the new location of the virtual sound source 14. In some examples, the localizer 38 and the motion tracker 40 may be the same component.

Systems that may be useful in some embodiments for creating the localizer 38 and/or the motion tracker 40 include the system marketed by Microsoft under the name HoloLens, or the systems marketed by Google as ARCore, or the systems marketed by Apple as ARKit. Each of these systems may utilize a combination of one or more cameras in order to detect objects, such as people, walls, etc. In particular, some such systems include a visual camera coupled with an infrared camera to determine depth or distance, which may be utilized in both rangefinding and motion tracking applications. Those of ordinary skill in the art will readily recognize other systems that may be utilized.

The system 10 may include an acoustic characteristic detector 42 for collecting or generating data relevant to at least one acoustic parameter or characteristic of the object 16 or the environment in which the user and the object 16 are located. In one embodiment, the detector 42 is arranged with or as a sensor to collect data related to the reverberation time and/or acoustic decay characteristics of the environment in which the user is located. For example, the detector 42 may produce (e.g., "ping") a specified sound signal (e.g., outside of the range of human hearing if desired) and measure the reflected response (e.g., with a microphone). In one embodiment, an absorption coefficient is calculated from the reverberation time or other characteristics of the environment as whole, and applied to the object 16 as an approximation. If the sound signal is specifically directed or aimed at the object 16, then the differences between the original signal and the initially received reflections can be used to calculate an absorption coefficient of the object 16.

It is to be appreciated that the components of the system 10 as shown in FIG. 3 can be integrated, combined, separated, modified, and/or removed as desired. For example, the signal processing circuit 28 and the controller 30 may share some common components and/or the signal processing circuit 28 can be integrated as part of the controller 30, while in other embodiments the signal processing circuit 28 and the controller 30 are separate assemblies. Similarly, the controller 30 may be included by the headphone assembly 12, the localizer 38, the motion tracker 40, etc., or may be part of a separate or remote device that is in communication with any of these components (e.g., via the communication module 36). Non-limiting examples for remote devices include a smartphone, tablet, or other mobile device, a computer, server, or designated computing hardware, e.g., implemented via networked or cloud infrastructure, an external camera or other sensor, etc. In one embodiment, the system 10 includes multiple of the controllers 30 with at least one integrated with the headphone assembly 12 and another as part of a remote device. As another example, some or all of the components of the acoustic characteristic detector 42 may be combined with the localizer 38. For example, an ultrasonic or similar proximity sensor may be used both for rangefinding and for producing the soundwave necessary to assess the absorption characteristics of an environment. Additionally, the localizer 38 may include a camera and the controller 30 may include an artificial neural network or other deep learning algorithm may be used to identify objects in images captured by the camera, such that recognized objects are assigned an absorption coefficient based on predetermined values, e.g., stored in a lookup table in the memory 34, which correlate a coefficient to each known object.

Figure 4:
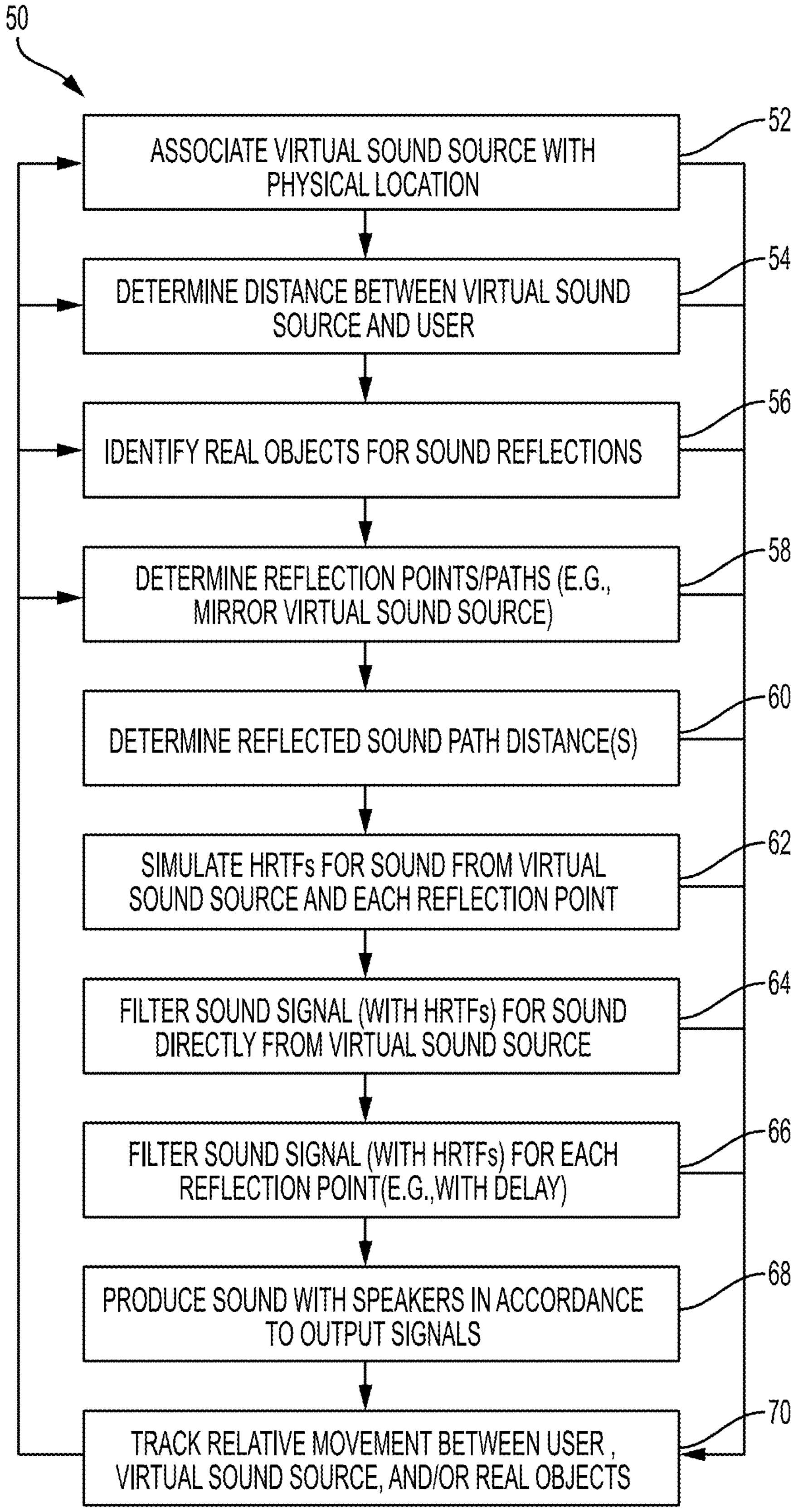
FIG. 4 is a flowchart illustrating a method of sound externalization according to the present disclosure.

While methods of operating the system 10 can be appreciated in view of the above description, FIG. 4 includes a flowchart depicting a method 50 to further aid in the current disclosure. At step 52, a virtual sound source (e.g., the virtual sound source 14) is associated with a physical location. At step 54, the distance (e.g., the distance X1) between the virtual sound source and the user is determined (e.g., utilizing the controller 30). As noted above, step 54 may include using the headphone assembly 12, a smartphone, or other device worn or carried by the user as a proxy for the user in calculating the distance.

At step 56, any number of acoustically reflective real objects (e.g., the object 16) in the environment surrounding the user are identified or detected. For example, step 56 may be achieved via use of the localizer 38 scanning or probing the environment with one or more of its sensors. The controller 30 may be configured with algorithms or functions that result in the controller 30 not selecting any object that is less than a threshold size, e.g., in detectable surface area or in one or more detected dimensions. As another example, the localizer 38 may include a camera and the controller 30 may include an artificial neural network or other deep learning mechanism that is trained with image-based object recognition capabilities, such that the controller 30 is configured to select only objects that it recognizes. In one embodiment, step 56 includes the localizer 38 downloading or generating a map or other data representative of the environment in which the user is located. For example, the localizer 38 may be configured to retrieve GPS or map data from an internet or other database. As one specific example, the Maps product by Google identifies three dimensional data for various objects, such as buildings, trees, etc. which may be retrieved by the localizer 38 and utilized to set the boundaries used to identify or define the objects 16.

At step 58, paths for reflected sound (e.g., the reflected sound paths 20) and points on the acoustically reflective real objects from which the sound is reflected (e.g., the reflection points 22) are determined (e.g., by the controller 30 utilizing the position data collected by the localizer 38). Step 58 may include creating copies of the virtual sound source that are mirrored with respect to the acoustically reflective objects (e.g., the mirrored copies 24). At step 60, the distance of the reflected sound path, and/or one or more segments comprising the reflected sound path are determined. For example, the reflected sound path may include a distance between the user (or other proxy) and the mirrored copies generated in step 58. The reflected sound path may additionally or alternatively include multiple segments such as a first segment from the virtual sound source to the reflection point (e.g., the distance X2) and/or a second segment from the reflection point to the user (e.g., the distance X3).

At step 62, HRTFs are generated or selected (e.g., via the controller 30) for sound to be received at each of the user's ears (e.g., via the speakers 26L and/or 26R) and each direct or reflected path to simulate sound originating from the virtual sound source 14, and as reflected from the acoustically reflective object at each of the reflection points. Step 62 may include analyzing data collected by one or more sensors of a motion tracker (e.g., the motion tracker 40) in order to determine an orientation of the user. An orientation of the virtual sound source 14 can be virtually set by the controller 30 to be utilized in calculating a directional impact of the radiation pattern of the virtual sound source.

At step 64, one or more "direct" output signals are generated (e.g., by the signal processing circuit 28) to represent the sound directly coming to the user from the virtual sound source. The output signals are generated by processing the desired sound signal (representing the sound being virtually emitted by the virtual sound source, e.g., as generated by the controller 30) according to the HRTFs generated in step 62 and any other desired signal processing. The number of output signals generated in step 62 can be equal to the number of speakers, i.e., with one output signal for each of the speakers 26, with each of the output signals processed by a different one of the HRTFs that corresponds to the intended speaker.

At step 66, one or more "reflected" output signals are generated similarly to step 64 but representing the sound coming to the user as reflected at each of the reflection points. In addition to applying the HRTFs generated in step 62, step 66 may include applying an absorption coefficient (e.g., generated by the controller 30 using the data gathered by the detector 42) for the real objects reflecting the virtual sound, or generally for the environment in which the user and the acoustically reflective objects are located. Additionally, since the reflected path of sound is expected to be longer than the direct sound path, step 66 may include delaying the reflected output signals by an amount of time equal to a difference between the length of the reflected path and the length of the direct path divided by the speed of sound. Typically, the human brain interprets any reflected sounds received by the ears within approximately 40 ms of the original to be essentially included as part of the original sound. In this way, step 66 may include not outputting the reflected output signal if the calculated delay is greater than about 40 ms. However, in other embodiments, output signals having greater than a 40 ms delay are specifically included in order to induce an echo effect, which may be particularly useful in simulating the sound characteristics for large open rooms, such as arenas or theatres, and thus advantageous for improving sound externalization in this type of environment.

At step 68 one or more speakers (e.g., the speakers 26) produce sound in accordance with the output signals generated in steps 64 and 66. The output signals intended for each speaker can be summed (e.g., by the signal processing circuit 28) before being sent to the respective ones of the speakers 26. As discussed above, due to the application of the HRTFs, particularity with respect to the HRTFs from the reflection points (e.g., the reflection points 22) on the acoustically reflective objects (e.g., the walls 16*a* and 16*b*, or other instances of the object 16), the externalization of the sound received by the user is significantly improved. By use of the HRTFs from the reflection points, the sound produced by the headphone assembly 12 includes acoustic characteristics specific to the actual environment in which the user is located, which the user's brain "expects" to hear if sound were created by a real object at the location of the virtual sound source 14. Advantageously, the simulation and synthetic or artificial insertion of the first early reflections of the virtual sound source from real objects in the environment (e.g., via the reflection paths 20) helps to convince the user's brain that the sound is occurring "external" to the user, at the location associated with the virtual sound source 14.

Step 68 proceeds to step 70 at which relative movement between the user, the virtual sound source, and/or the acoustically reflective objects is tracked. In response to any such relative movement, the method 50 can be returned to any of previous steps 52, 54, 56, or 58 in order to recalculate any of the corresponding locations, orientations, distances, HRTFs, or output signals. Additionally, each of the steps previous to step 68 can immediately proceed to step 70. In other words, the system 10 can be arranged in accordance with the method 50 to be constantly, e.g., in real-time, monitoring the real-world environment about the user, the acoustically reflective objects in the environment, and/or the user's location in the real world environment in order to update the sound produced by the speakers. In this way, the system 10 is able to dynamically change the output signal as the user moves (e.g., as determined from the data collected by the localizer 38), the user rotates their head (e.g., as determined from the data collected by the motion tracker 40), the virtual sound source 14 is moved (e.g., by the controller 30 setting a new location for the virtual sound source 14), the object 16 moves (e.g., a nearby car forming the object 16 drives away or a window or door in a wall forming the object 16 is opened), etc.

It is to be appreciated that other sensory modalities can be augmented in addition to the acoustic augmentation achieved in accordance with the above-described embodiments. One example includes visual augmented reality elements, although touch (haptic feedback), smell, taste, or other senses may be augmented if desired. To this end, FIGS. 5-6 illustrate specific embodiments in which multiple sensory modalities, namely, sound and sight, are both virtually augmented.

Figure 5:
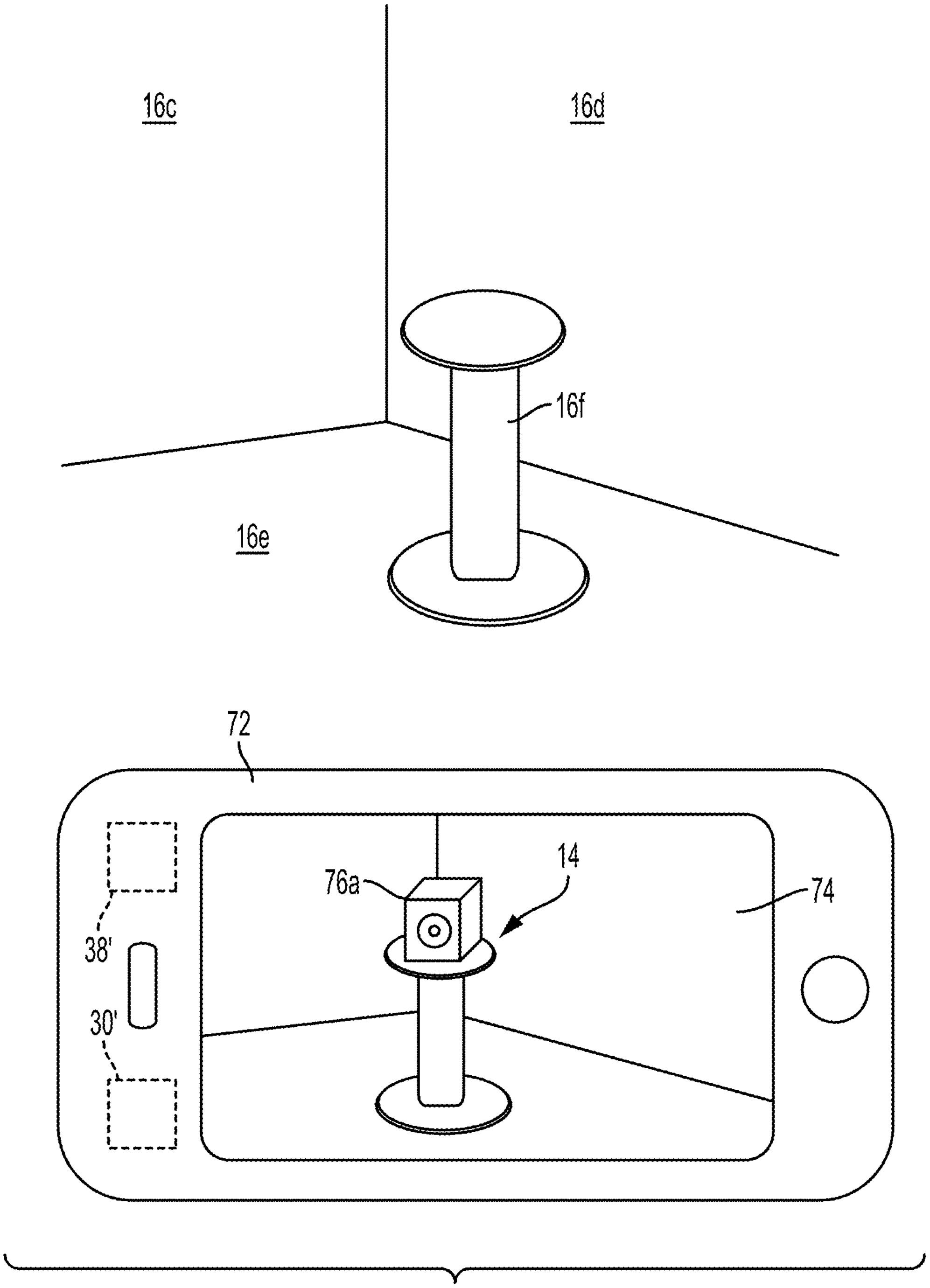
FIGS. 5-6 illustrate example scenarios utilizing a display to supplement the sound externalization systems disclosed herein with visual augmentation.
Figure 6:
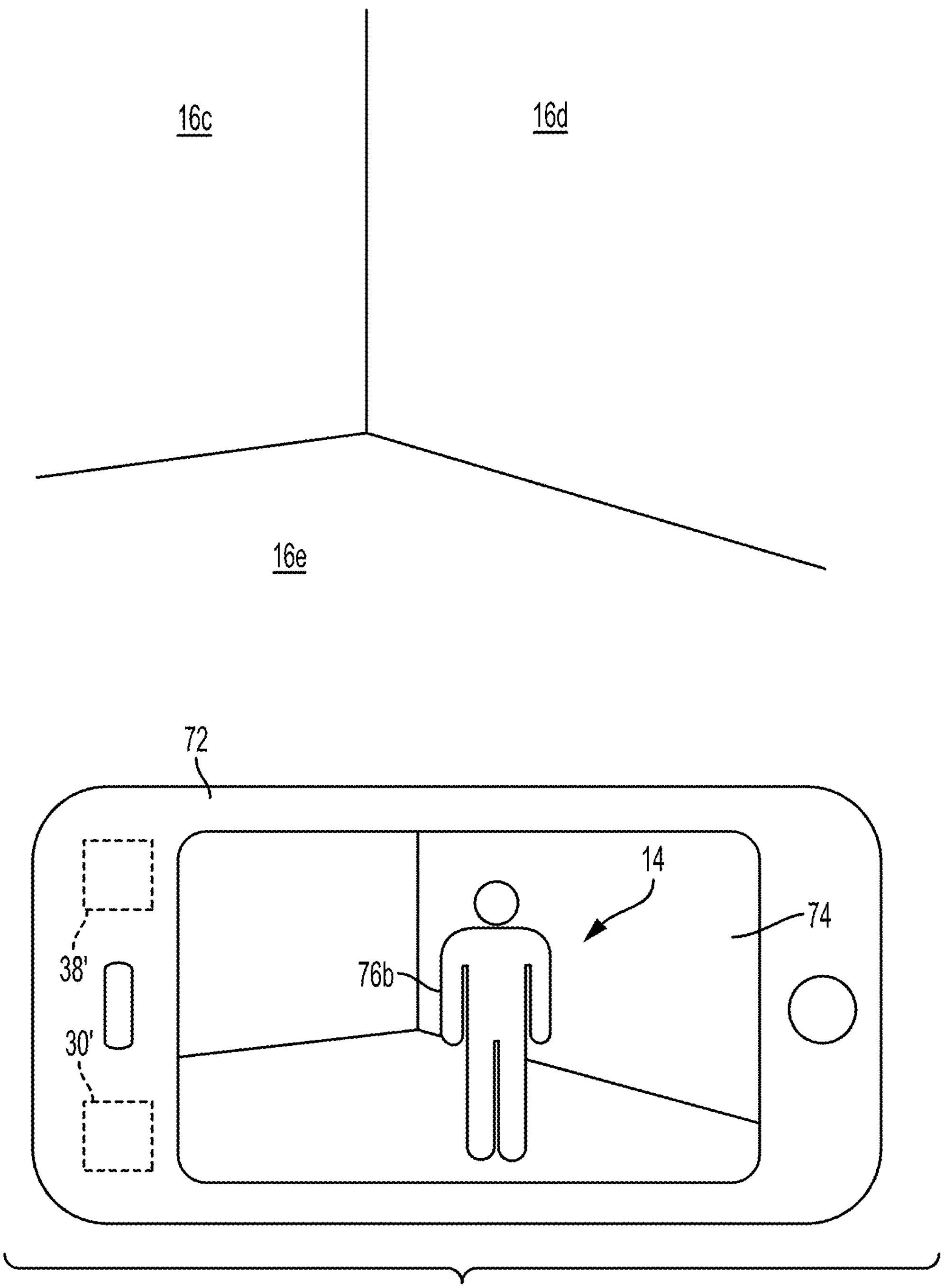

In FIG. 5, a physical environment, e.g., a room, is illustrated having a first wall 16*c*, a second wall 16*d*, a floor 16*e*, and a pedestal 16*f*. The system 10, when used in the environment of FIG. 5, may detect any or all of these objects to form an instance of an acoustically reflective object (the object 16) from which the sound from a virtual sound source can be reflected. In this embodiment, a smartphone 72 is included as an example of a supplemental augmentation device, and may form a part of the system 10. It is to be appreciated that any other device having a display capable of producing a computer generated visual element, e.g., heads-up display, "smart glasses", tablets, or other computing devices, can be utilized in lieu of or in addition to the smartphone 72.

In the embodiment of FIG. 5, the smartphone 72 comprises a controller 30' that at least partially defines the controller 30 (e.g., singly comprises the controller 30 or is one of several controllers that together comprise the controller 30). Additionally, the smartphone 72 includes a camera 38', which at least partially forms the localizer 38 for this embodiment. The smartphone 72 includes a display or screen 74 through which visual elements of augmented reality can be displayed. For example, the smartphone 72 is illustrated in the foreground of FIG. 5, thus generally representing the perspective of a user holding the smartphone 72 and observing the environment in front of the user, as captured by the camera 38', in the display 74.

In addition to the acoustically reflective objects in the environment, the display 74 also shows a virtual avatar 76*a* to visually represent the virtual sound source 14. The virtual avatar 76*a* in this example takes the form of a loudspeaker, but any other imaginable shape or three-dimensional virtual construct may be utilized. The virtual avatar 76*a* can be created by the system 10 (e.g., via the controller 30') to represent the virtual sound source 14 and create a visual cue to the user regarding the location of the virtual sound source 14. For example, if the loudspeaker avatar of FIG. 5 is utilized, the sound signal may include music, which will be perceived by the user as emanating from the location of the avatar 76 shown to the user in the display 74, although the loudspeaker does not physically exist. In this way, a user wearing the headphone assembly 12 and viewing their environment through the smartphone 72 (or the display of another visual augmentation device) would see the avatar 76 depicting a loudspeaker sitting on the pedestal 16*f* in the display 74.

It is to be appreciated that virtual avatars can take any shape or form. For example, FIG. 6 illustrates a similar scenario to FIG. 5 in which the smartphone 72 is depicting a room on the display 74 as captured by the camera 38'. Without the display 74, the room appears to be empty, but the display 74 displays a virtual avatar 76*b* in the form of a person for the virtual sound source 14 in FIG. 6. For example, if the sound signal associated with the virtual sound source 14 (and being played by the headphone assembly 12) is a song, the person depicted by the display 74 may appear as the singer or musician that recorded that song.

As a result of the calculated HRTFs, the user would perceive the sound produced by the speakers 26 of the headphone assembly 12 as if it were coming from the indicated location of the virtual avatar. As the user moves about the room, orients their head to examine the virtual avatar, or as the controller moves the location of the virtual avatar and/or animates the virtual avatar, e.g., to move it (and the corresponding location virtual sound source) about the room, the system 10 can be configured to react, e.g., in real-time, as discussed above with respect to step 70 of the method 50, to recalculate the HRTFs so that the sound is continually perceived as coming from the particular location indicated by the virtual avatar and associated with the virtual sound source 14. It is also to be appreciated that a virtual avatar does not need to be utilized. For example, the virtual sound source 14 may be set to any location in the environment, such as an empty spot on the floor 16*e*, or to correspond to the location of a physical object, such as the pedestal 16*f* itself (without the avatar 76*a*). Those of ordinary skill in the art will recognize additional virtual elements and other sensory augmentations that can be utilized with the system 10. It should be appreciated that various examples may not include any visual display components and/or may not be augmented in modalities other than audio.

Figure 7:
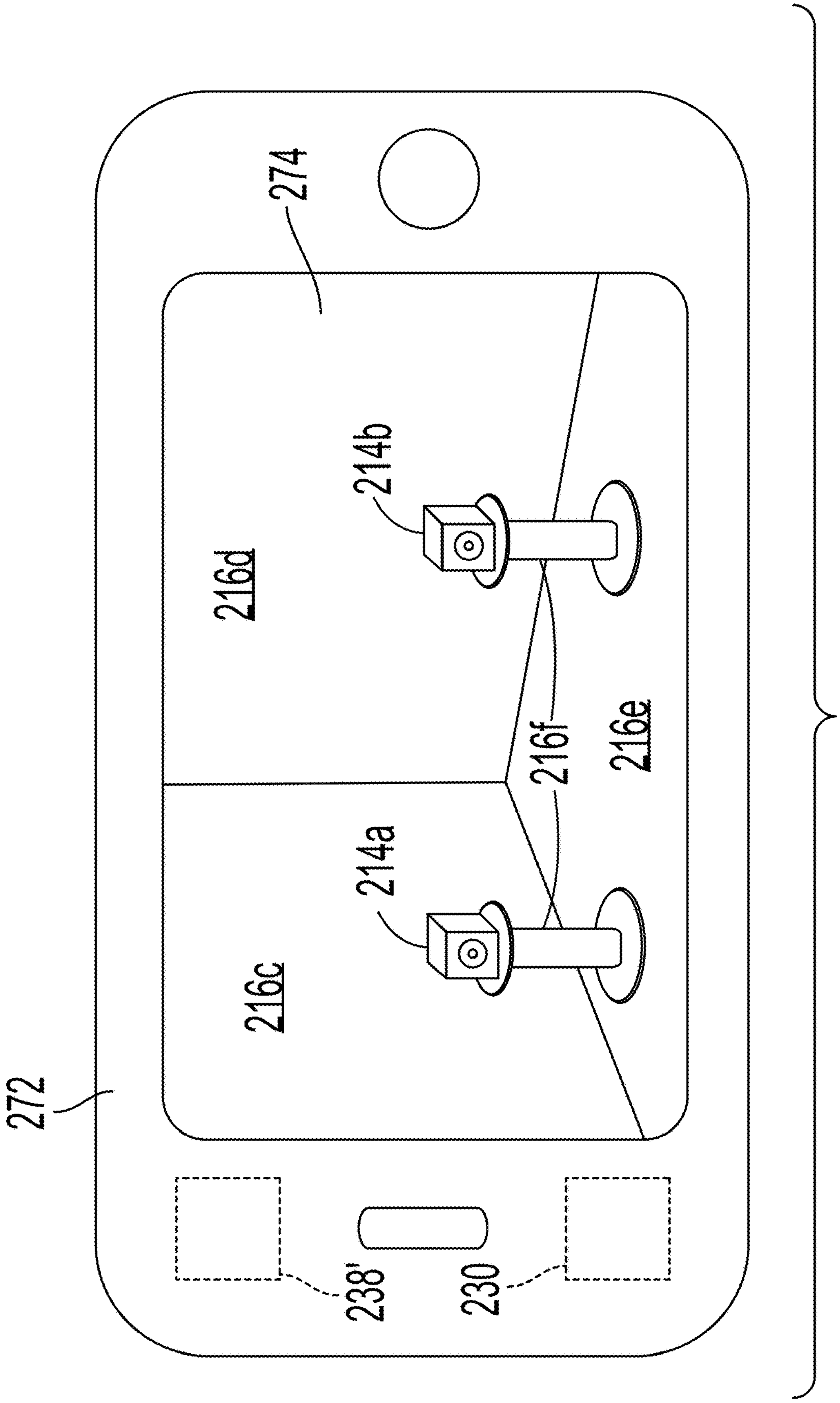
FIG. 7 is an example scenario utilizing a display to supplement the sound externalization systems disclosed herein with visual augmentation.
Figure 10:
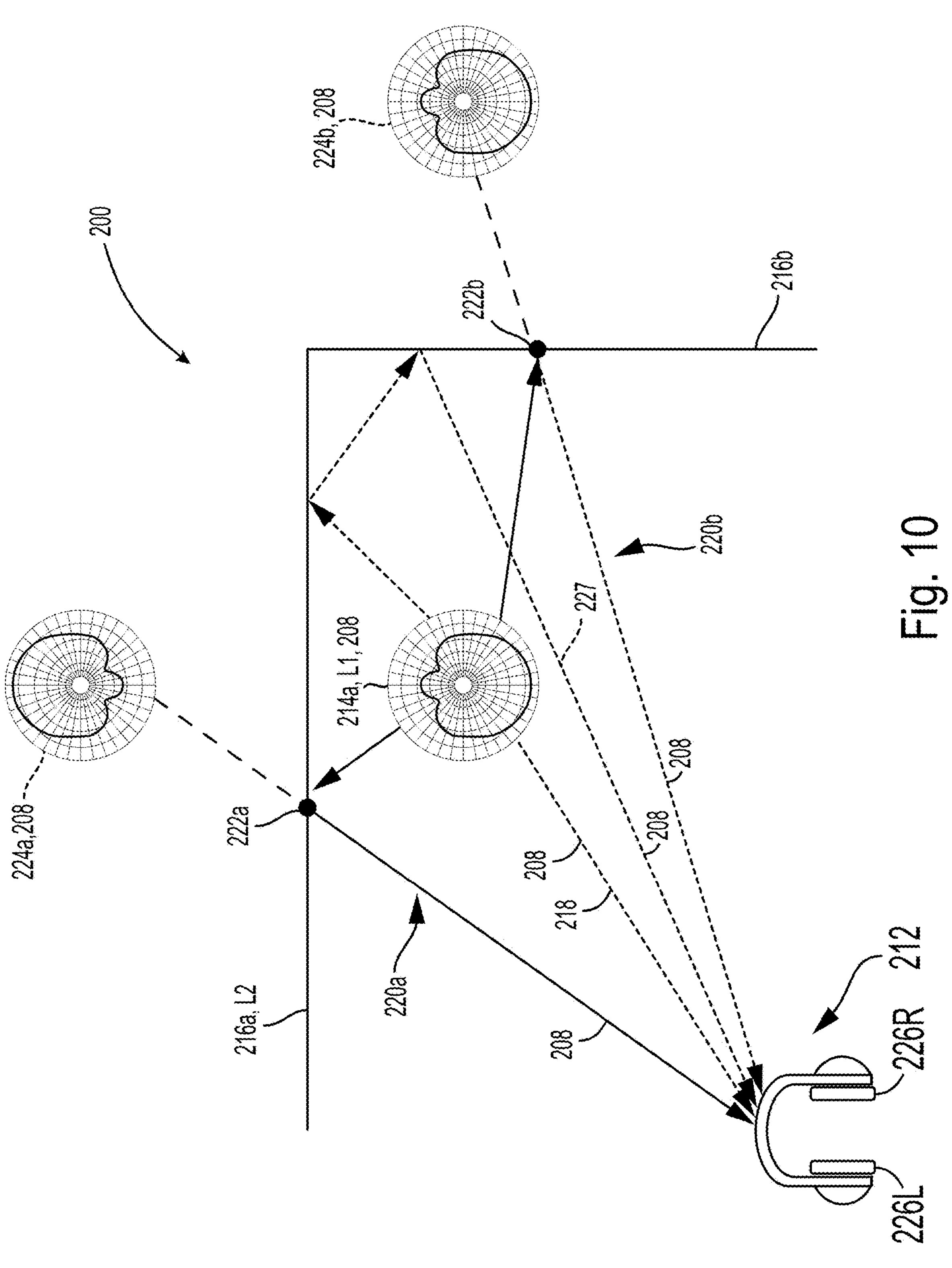
FIG. 10 illustrates a schematic view illustrating direct, primary reflected, and secondary reflected sound paths from one virtual sound source including a schematic representation of directional characteristics of each path.

FIGS. 7-10 illustrate additional examples of sound externalization system 210 according to the present disclosure. Sound externalization system 210 includes a headphone assembly 212 positioned on or in proximity to user 200 and arranged to produce HTRFs as described above in detail. As illustrated in FIGS. 7-10, the concepts described above with respect to simulating virtual sound from a virtual sound source can be extended to simulation of a plurality of sound sources 214, for example, a stereo pair of virtual speakers (as illustrated in FIG. 7), or a surround sound system (as illustrated in FIG. 10), e.g., a system having more than two speakers. Surround sound systems can also include at least two treble speakers and at least one subwoofer or bass speaker. It should be appreciated that this can include 5.1, 7.1, or 9.1 surround sound corresponding to systems with 5 treble speakers and 1 subwoofer or bass speaker, 7 treble speakers and 1 subwoofer or bass speaker, or 9 treble speakers and 1 subwoofer or bass speaker, respectively. Additionally, since each virtual speaker in the plurality of speakers is arranged to produce sound, to accurately simulate the effect of directional speakers, e.g., the speakers of a stereo pair or surround sound speakers, the sound externalization system 210 discussed herein further simulates a radiation pattern of sound from each virtual sound source and for each sound path, e.g., direct and one or more reflected sound paths. As headphone assembly 212 can provide left and right audio, e.g., via a left headphone speaker 226L and a right headphone speaker 226R, each HRTF described below may be used to generate a respective signal that can be provided to the user's left ear (e.g., played through the left headphone speaker 226L) and provided to the user's right ear (e.g., played through the right headphone speaker 226R) which can include any combination of the HRTFs that will be described.

Figure 8:
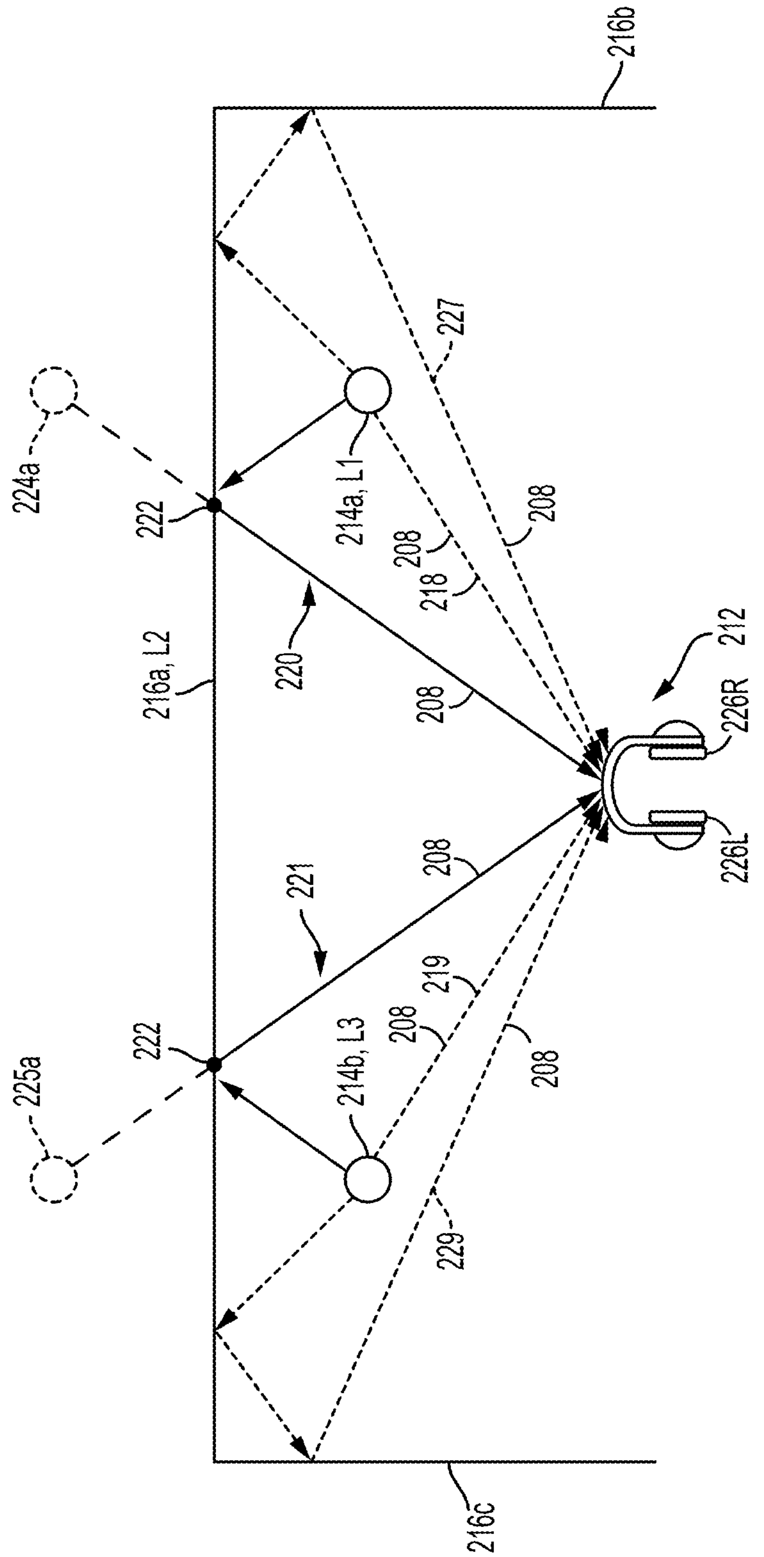
FIG. 8 is a schematic view illustrating direct, primary reflected, and secondary reflected sound paths from two virtual sound sources according to the present disclosure.
Figure 9A:
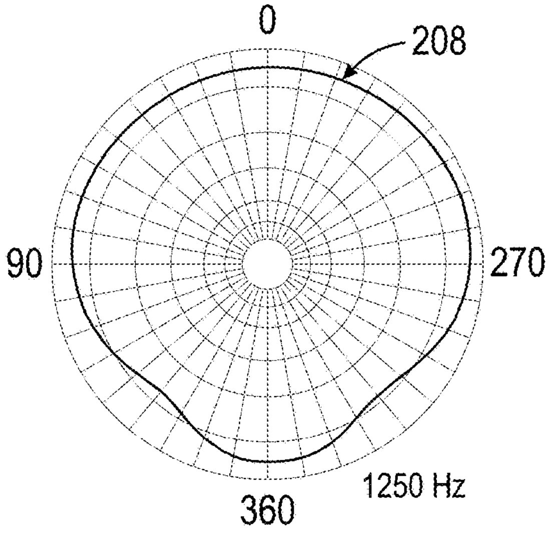
FIGS. 9A-9D illustrate graphical representations of directional characteristics of virtual sound sources according to the present disclosure.
Figure 9B:
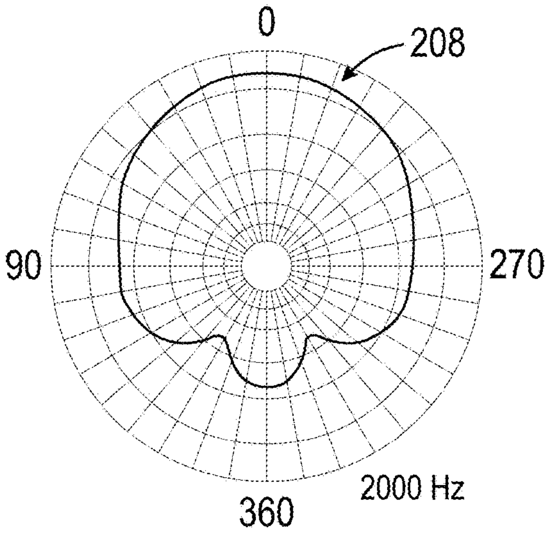
Figure 9C:
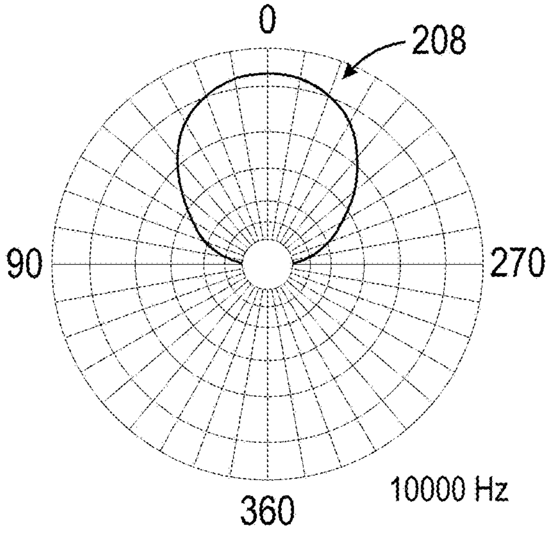
Figure 9D:
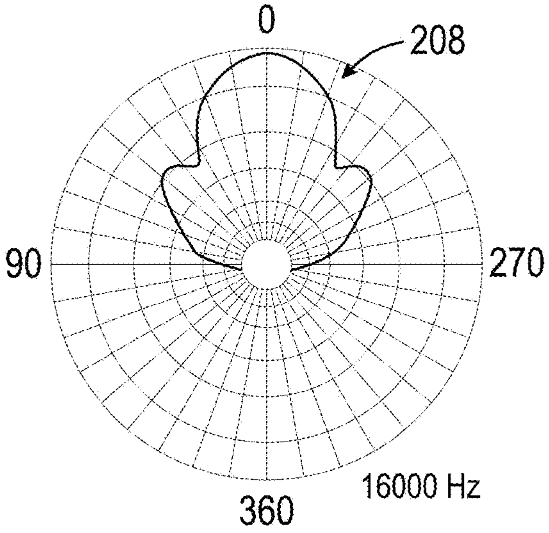

As illustrated in FIGS. 7 and 8, the example above with respect to FIG. 5 can be extended to include multiple virtual sound sources. For example, sound externalization system 210 can include a plurality of virtual sound sources 214*a*-214*b*. In various instances, the locations of virtual sound sources may coincide with actual sound sources. For example, a sound virtualization system in accord with those described herein may be configured to locate virtual sound sources in the positions of actual loudspeakers, which may allow a user to virtualize their existing audio system, which may further allow listening to a virtual version of their audio system through a personal audio device, such as headphones, as may be desirable, for instance, to not disturb another person in the environment. As shown in FIG. 7, a plurality of virtual sound sources can include a first virtual sound source 214*a* and a second virtual sound source 214*b* arranged as a left/right stereo speaker pair, respectively. Similarly to the example described above with respect to FIG. 5, a smartphone 272 or other mobile computing device may be arranged to view an environment having a plurality of acoustically reflective surfaces 216*a*-216*f* which can include walls, ceilings, floors, furniture, or other acoustically reflective objects with the environment such as the pedestals that plurality of virtual sound sources 214*a* and 214*b* are projected upon as well as other objects in the room such as furniture or people. As discussed below with respect to reflective surfaces and objects 16, plurality of acoustically reflective objects 216*a*-216*f* may include an acoustically reflective characteristic ARC. As illustrated, smartphone 272 may have a display or screen 274 arranged to provide a real-time image of the environment as captured by camera 238'. Similarly to the example described above with respect to FIG. 5, smartphone 272 may further include a controller 230' which may include a processor 232 and memory 234 arranged to execute and store, respectively, a set of non-transitory computer readable instructions 235 to perform the various functions described below, e.g., calculation of HRTFs to simulate various sound paths discussed. It should be appreciated that controller 230 may alternatively communicate with an external device arranged to calculate the HRTFs discussed below. Additionally, as described above, sound externalization system 210 may include a sensor or a localizer 238 (not shown) to perform at least one scan of the environment the user 200 and/or the smartphone 272 is located in to determine the one or more acoustically reflective surfaces 216 discussed below.

As illustrated in FIG. 8 and described in the example above with a stereo pair of virtual sound sources, i.e., first virtual sound source 214*a* at a first location L1 and second virtual sound source 214*b* at a third location L3, a direct sound path between each virtual sound source and headphone assembly 212 can be calculated and simulated as described above. For example, a first direct sound path 218 is simulated from first virtual sound source 214*a* and a second direct sound path 219 is simulated from second virtual sound source 214*b*. Each direct sound path (218 and 219) is simulated via a respective first left HRTF 204L (not shown) and a first right HRTF 204R (not shown) where each first left HRTF 204L simulates sound from direct sound paths (218,219) as they would be perceived to the user's left ear in the environment if each virtual sound source were a physical sound source, i.e., a non-virtual sound source, and each first right HRTF 204R simulates sound from each direct sound path (218,219) as they would be perceived to the user's left ear in the environment if each virtual sound source were a physical sound source.

Additionally, as illustrated in FIG. 8, a primary reflected sound path may be simulated for each virtual sound source at headphone assembly 212. For example, similarly to the example described and illustrated with respect to FIG. 5, a first primary reflected sound path 220 may be calculated and simulated for virtual sound simulated from first virtual sound source 214*a*. This primary reflected sound path 220 is intended to simulate the acoustic effects on sound generated by first virtual sound source 214*a* within a physical, i.e., non-virtual environment, that would be caused by first order reflected sound paths, i.e., sound that has reflected off of a single acoustically reflective surface and back to the user. The simulation may include generation of a first mirrored copy 224*a* of first virtual sound source 214*a*, e.g., mirrored about reflection point 222 on reflective surface 216*a* at a second location L2. Additionally, a second primary reflected sound path 221 may be calculated and simulated for virtual sound simulated from second virtual sound source 214*b*. Similarly to the first reflected sound path, the second reflected sound path is intended to simulate the acoustic effects on sound generated by second virtual sound source 214*b* within a physical, i.e., non-virtual environment, that would be caused by first order reflected sound paths, i.e., sound that has reflected off of a single acoustically reflective surface and back to the user. The simulation may include generation of a second mirrored copy 225*a* of the second virtual sound source 214*b*, e.g., mirrored about reflection point 222 on reflective surface 216*a*. Similarly to the simulated direct sound paths described above, each primary reflected sound path is simulated at headphone assembly 212 using HRTFs. For example, each of the first primary reflected sound path 220 and the second primary reflected sound path 221 can utilize second left HRTF 205L and second right HRTF 205R to simulate each reflected sound path from the first and second virtual sound sources as they would be perceived to the user's left and right ear's respectively.

Furthermore, as illustrated in FIG. 8, a secondary reflected sound path may be simulated for each virtual sound source at headphone assembly 212. For example, a first secondary reflected sound path 227 may be calculated and simulated for virtual sound simulated from first virtual sound source 214*a*. This first secondary reflected sound path 227 is intended to simulate the acoustic effects on sound generated by first virtual sound source 214*a* within a physical, i.e., non-virtual environment, that would be caused by second order reflected sound paths, i.e., sound that has reflected off of a at least two acoustically reflective surfaces and back to the user, e.g., acoustically reflective surfaces 216*a* and 216*b*. Additionally, a second secondary reflected sound path 229 may be calculated and simulated for virtual sound simulated from second virtual sound source 214*b*. Similarly to the first secondary reflected sound path 227, the second secondary sound path 229 is intended to simulate the acoustic effects on sound generated by second virtual sound source 214*b* within a physical, i.e., non-virtual environment, that would be caused by second order reflected sound paths, i.e., sound that has reflected off of at least two acoustically reflective surfaces and back to the user, e.g., acoustically reflective surfaces 216*a* and 216*c*. Similarly to the simulated primary reflected sound paths described above, each secondary reflected sound path is simulated at headphone assembly 212 using HRTFs. For example, each of the first secondary reflected sound path 227 and the second secondary reflected sound path 229 can utilize third left HRTF 206L and third right HRTF 206R to simulate each reflected sound path from the first and second virtual sound sources as they would be perceived to the user's left and right ear's respectively.

Although illustrated and described above using only one direct sound path, one primary reflected sound path, and one secondary reflected sound path, it should be appreciated that sound externalization system 210 may be arranged to simulate, using respective left and right HRTFs, any number of direct, primary reflected, secondary reflected, tertiary, or n-ary reflected sound paths at headphone assembly 212. For example, with respect to primary reflected sound paths, sound externalization system 210 may utilize at least one primary reflected sound path from each wall, ceiling, or floor within the environment, resulting in at least six primary reflected sound paths for each virtual sound source within the environment, e.g., if the environment is a rectangular room, for instance. Additionally in such a room, for each primary reflected sound path, there could be five additional secondary reflected sound paths, i.e., where each primary reflected sound is further reflected off of the remaining five walls in a second order reflection, such that there may be thirty secondary reflected sound paths in a typical room. This means that for each virtual sound source within the environment, there could be at least thirty-seven simulated sound paths (one direct sound path, six primary reflected sound paths, and thirty secondary reflected sound paths), each being simulated using respective left and right HRTFs. In various examples, additional reflected sound paths may account for reflections off any number of walls and/or objects and may include any number of multiply reflected sound paths, e.g., $3^{rd}$ order, $4^{th}$ order, etc.

In a physical system, each speaker may generate sound waves with a directional component, i.e., where an acoustic radiation pattern is not angularly uniform around the speaker, e.g., 360 degrees around the speaker in a primary plane of the speaker (in two dimensions) and likewise not spherically uniform around the entire 47*c* steradians of solid angle about the speaker (in three dimensions). Thus, it is desirable that to simulate sound generated in each of the simulated sound paths described above in a virtual sound system, where each virtual sound source can produce sound with a directional characteristic or component. Additionally, physical speaker systems typically generate acoustic radiation patterns that are dependent on frequency. As illustrated in FIGS. 8 and 9A-9D, the directional characteristics 208 of sound simulated by the plurality of virtual sound sources can be made to vary with frequency similarly to real physical sound sources. As shown in FIGS. 9A-9D as frequency increases the pattern of the directional characteristics 208 vary.

The terms "directional characteristic" or "directional characteristics" as used herein are intended to mean a portion of the acoustic sound radiation pattern that is shaped or directed in a particular direction, i.e., in the direction of a user or other target with respect to the 360 degree (in a primary plane) or the fully three-dimensional acoustic radiation patterns produced by a virtual speaker. For example, in each acoustic radiation pattern shown in FIGS. 9A-9D, there is a portion of the 360 degree sound signal that is skewed or primarily directed in the 0 degree position in the 360 degree plot, e.g., upwards as oriented in the figure. This directional characteristic may correspond with the direction of a virtual sound source and may face the position or location of the user 200 within the environment, in some instances. Importantly, as each sound path, direct or reflected, will have its own angle α, i.e., its own unique angle toward the user's position with respect to the virtual sound source's primary orientation, a unique direction characteristic 208 can be associated with each sound path. Thus, there will be as many unique directional characteristics 208 as there are sound paths. This preserves the simulated directional characteristics of the reflected sound paths that have been reflected in first order or second order reflections improving the realism of the virtual sound quality.

As illustrated in FIG. 10, at least one primary reflected sound path may be simulated for each virtual sound source at headphone assembly 212. For example, similarly to the example described and illustrated with respect to FIG. 5, a first primary reflected sound path 220*a* may be calculated and simulated for virtual sound simulated from first virtual sound source 214*a*. This primary reflected sound path 220*a* is intended to simulate the acoustic effects on sound generated by first virtual sound source 214*a* within a physical, i.e., non-virtual environment, that would be caused by first order reflected sound paths, i.e., sound that has reflected off of a single acoustically reflective surface and back to the user. The simulation may include generation of a first mirrored copy 224*a* of first virtual sound source 214*a*, e.g., where first mirrored copy 224*a* is formed by reflective surface 216*a*. As shown in FIG. 10, the radiation pattern of first virtual sound source 214*a* is shown schematically in first location L1. As shown, the directional characteristic 208 of the virtual sound produced at first virtual sound source 214*a* at location L1 is facing away from acoustically reflective surface 216*a*. Additionally, the acoustic radiation pattern of first mirrored copy 224*a*, formed by reflective surface 216*a*, is mirrored or reflected as though it were mirrored across a horizontal line parallel with acoustically reflective surface 216*a* such that the directional characteristic of the radiation is reflected over acoustically reflective surface 216*a*. As illustrated, directional component 208 of first mirrored copy 224*a* is also facing away from reflective surface 216*a*. It should be appreciated that the first mirrored copy 224*a* is positioned such that a sound path between the first mirrored copy 224*a* and the user passes through first reflection point 222*a*. Additionally, an additional primary reflected sound path 220*b* may be calculated and simulated for virtual sound simulated from first virtual sound source 214*a*. Similarly to the first reflected sound path, the additional reflected sound path is intended to simulate the acoustic effects on sound generated by first virtual sound source 214*a* within a physical, i.e., non-virtual environment, that would be caused by first order reflected sound paths, i.e., sound that has reflected off of a single acoustically reflective surface and back to the user, e.g., reflection off of acoustically reflective surface 216*b*. The simulation may include generation of a second mirrored copy 224*b* of the first virtual sound source 214*a*, e.g., where second mirrored copy 224*b* is formed by reflective surface 216*b*. As shown, the directional characteristic 208 of the virtual sound produced at first virtual sound source 214*a* at location L1 is facing away from acoustically reflective surface 216*a*. As the acoustic radiation pattern of mirrored copy 224*b* is formed by reflective surface 216*b* as though it was mirrored across a vertical line parallel with acoustically reflective surface 216*b* the directional characteristic 208 of the radiation is reflected vertically over acoustically reflective surface 216*b* and also faces away from acoustically reflective surface 216*a*. It should be appreciated that the second mirrored copy 224*b* is positioned such that a sound path between the second mirrored copy 224*b* and the user passes through second reflection point 222*b*.

Figure 11:
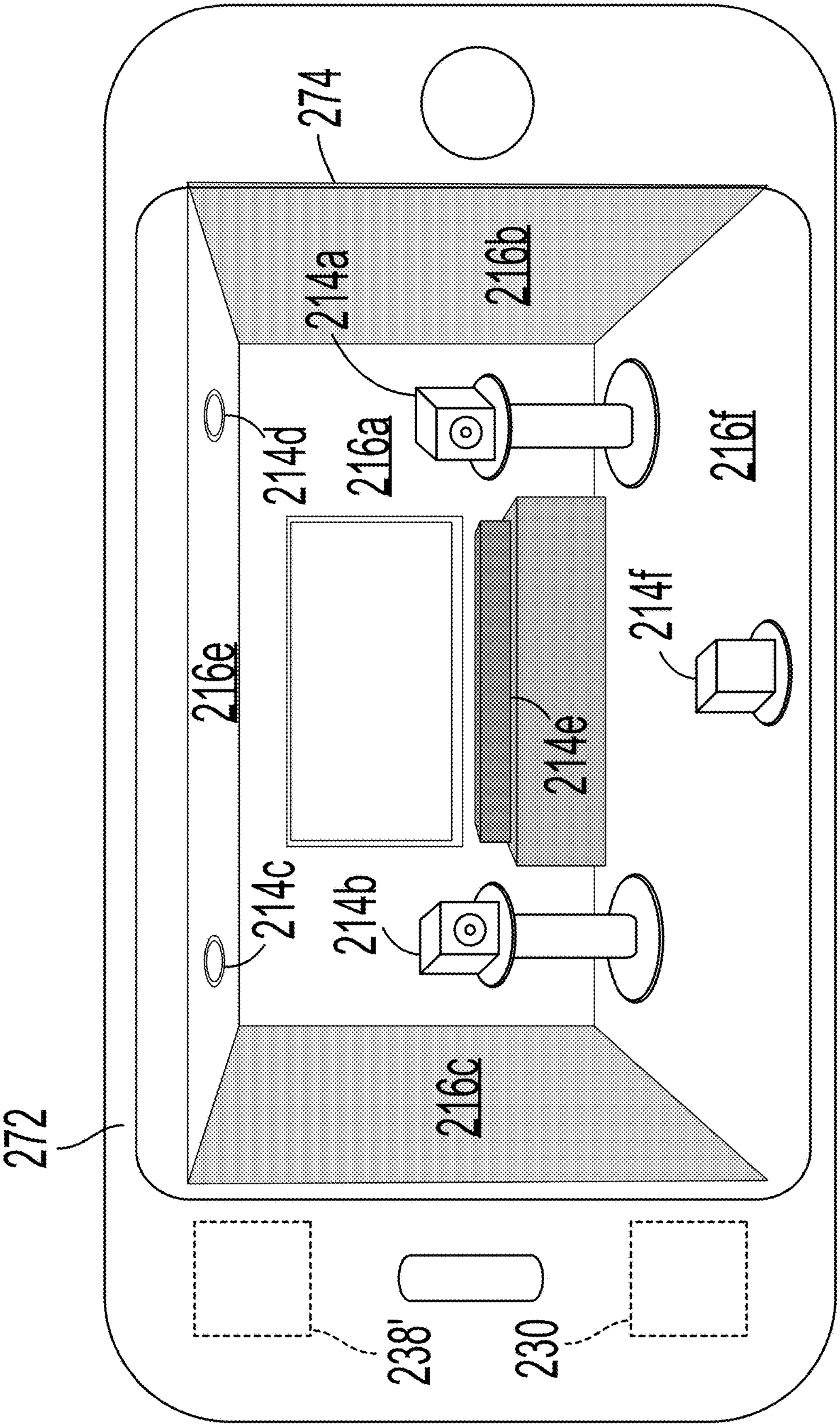
FIG. 11 illustrates is an example scenario utilizing a display to supplement the sound externalization systems using a surround sound system disclosed herein with visual augmentation.

As illustrated in FIG. 11, and as mentioned above, the concept discussed above with respect to a plurality of virtual sound sources can be extended to more than a stereo pair of virtual speakers. For example, sound externalization system 210 may include a plurality of virtual speakers in the form of a simulated surround sound system, i.e., a system that includes more than two virtual speakers. In one example, illustrated in FIG. 10, a plurality of virtual sound sources may be configured in a 5.1 surround sound configuration, i.e., five primary speakers 214*a*-214*e* (e.g., left, right, center, and two rear) and 1 subwoofer or bass speaker 214*f*. It should be appreciated that each speaker may be virtually embodied as a stand-alone speaker assembly, e.g., 214*a*, 214*b*, and 214*f*, may be virtually embodied as a recessed or built-in speaker assembly, e.g., 214*c* and 214*d*, or may be simulated as a stand-alone sound-bar, e.g., 214*e*. As discussed above, each one of these simulated virtual sound sources 214*a*-214*f*, can be simulated via at least one direct sound path, one or more primary reflected sound paths, secondary reflected sound paths, and/or higher order reflected sound paths. For example, as each virtual sound source may be simulated with the thirty-seven sound paths and respective HRTFs discussed above, this would mean that in a 5.1 surround sound environment as shown, as many as two-hundred and twenty-two sound paths would be simulated, thirty-seven for each of the six virtual sound sources. It should be appreciated that although not illustrated, more than five primary speakers can be used, for example, rather than 5.1, a 7.1 or 9.1 surround sound system or any other surround sound system that utilizes more than two speakers may be virtualized. In some examples, virtual sound sources may be located at varying elevations, such as in a 5.1.4 system having virtual ceiling speakers. Additionally, various examples may include virtual sound sources that move, such that an audio signal may be processed in accord with the systems and methods herein to sound as though it is coming from a source moving through the environment, e.g., a person walking past or an object moving by, such as may be in accord with, e.g., a Dolby Atmos object. Additionally, it should be appreciated that the directional characteristics 208 as described above may be applied in each simulated direct and reflected sound path, for each respective applicable direction, for each virtual sound source discussed above.

Figure 12:
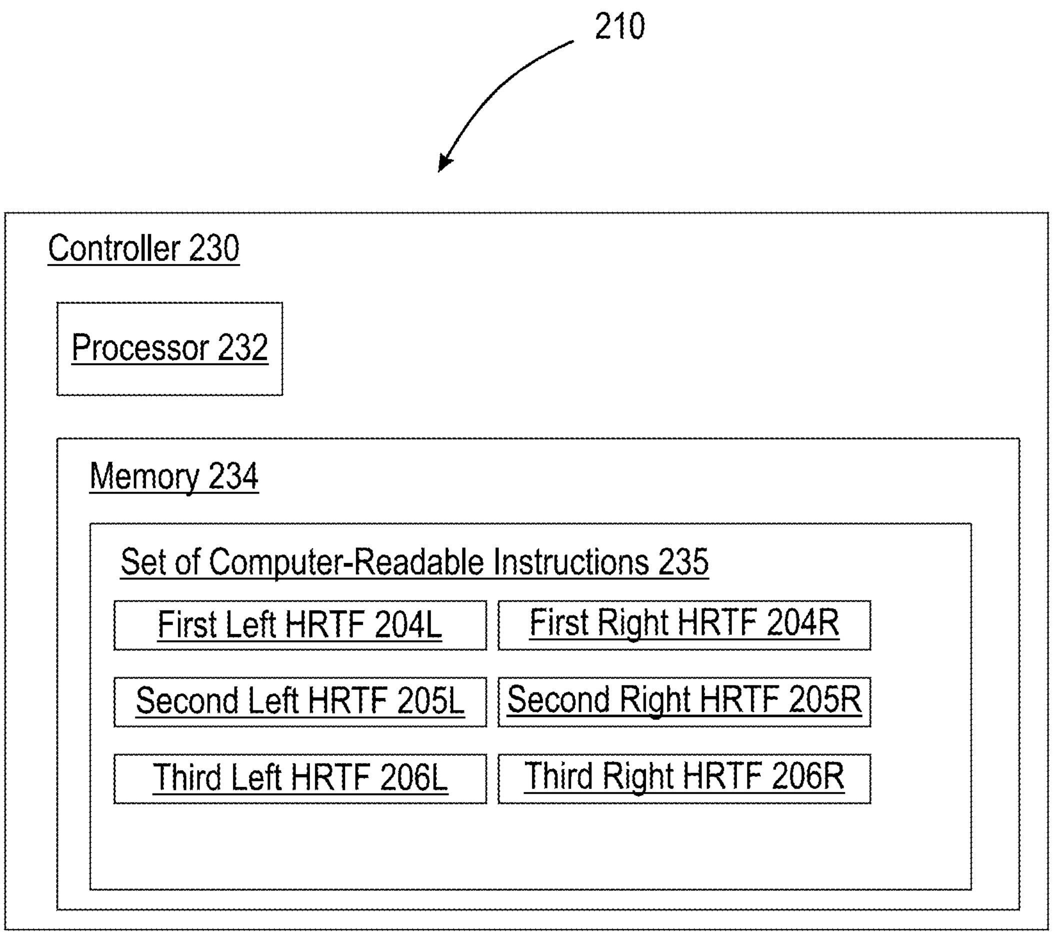
FIG. 12 illustrates a schematic representation of a controller according to the present disclosure.

FIG. 12 illustrates schematic representation of controller 230 and its component parts. As discussed above, controller 230 can include processor 232 and memory 234 arranged to execute and store, respectively, set of non-transitory computer readable instructions 235 to perform the functions of headphone assembly 212 as discussed herein. Furthermore, as illustrated it should be appreciated that memory 234 can store the information related to the HRTFs discussed above. In one example, controller 230 is arranged to calculate and generate HRTFs 204L-206R as discussed above. In another example, controller 230 is arranged to receive these HRTFs pre-calculated and generated and headphone assembly 212 merely generates corresponding audio signals associated with the HRTFs.

Figure 13:
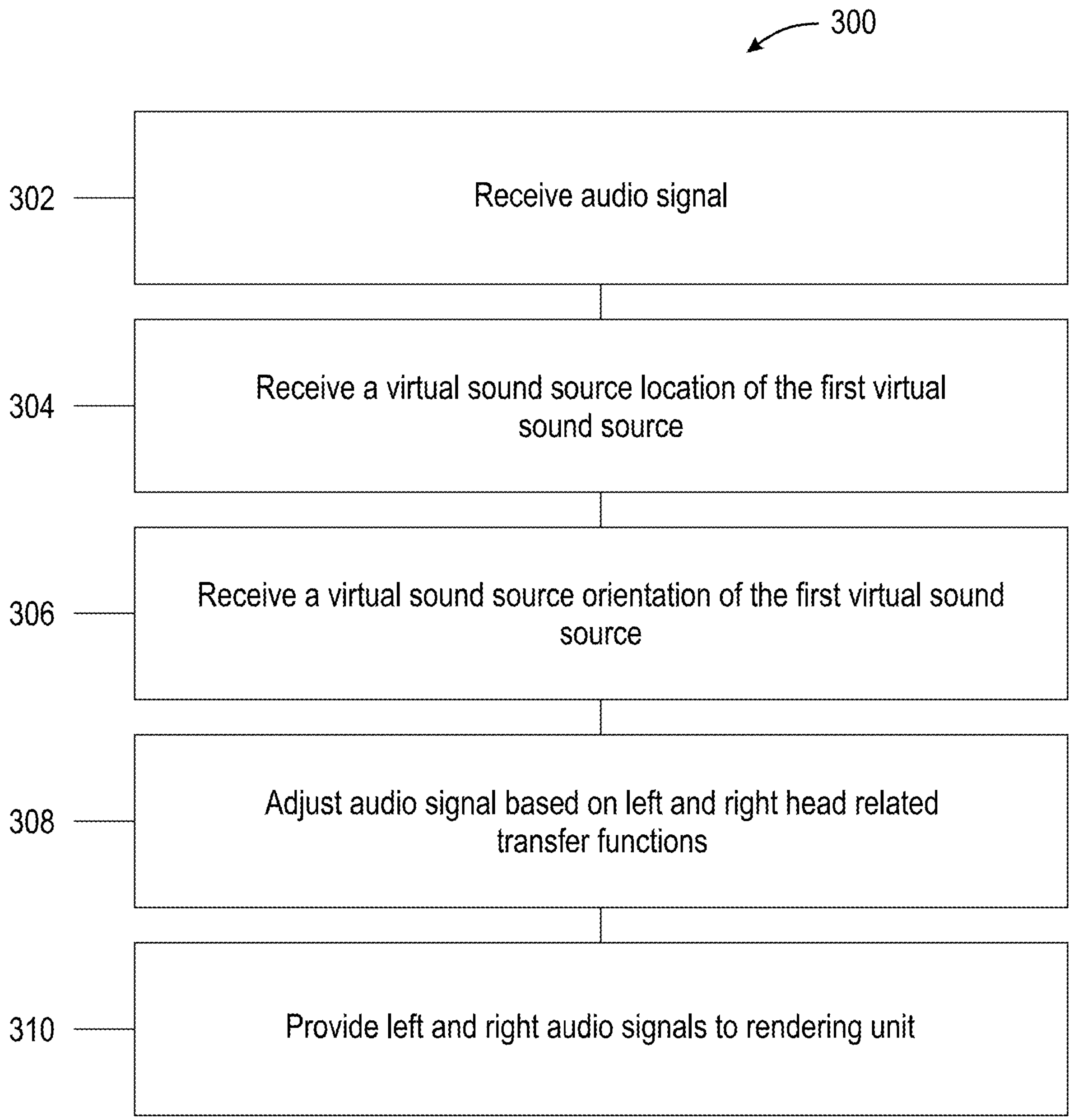
FIG. 13 is a flow chart illustrating the steps of a method according to the present disclosure.

FIG. 13 illustrates method 300 according to the present disclosure. Method 300 may include, for example: receiving, at a headphone assembly 212, an audio signal generated by a first virtual sound source 214*a* and a virtual sound source location L1 of the first virtual sound source 214*a* (step 302); receiving a virtual sound source orientation of the first virtual sound source (step 304); receiving a virtual sound source orientation of the first virtual sound source (step 306); adjusting the audio signal based at least in part on a radiation pattern characteristic (208) of the audio signal generated by the first virtual sound source 214*a* (step 306); adjusting the audio signal based at least in part on a left and right head related transfer function (HRTF) (step 308); and providing left and right audio signals to a rendering unit (step 310).

Figure 14:
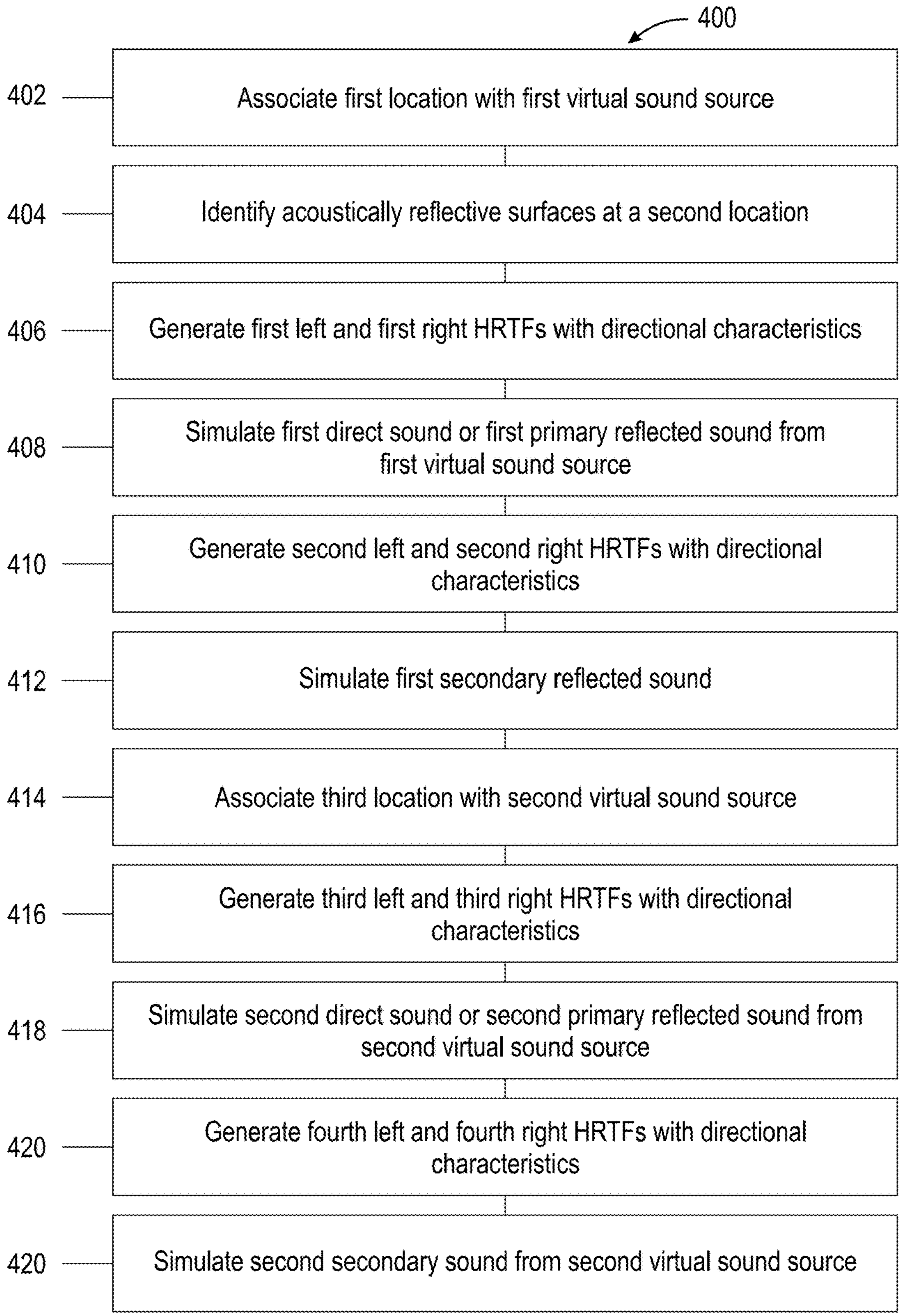
FIG. 14 is a flow chart illustrating the steps of a method according to the present disclosure.

FIG. 14 illustrates method 400 according to the present disclosure. Method 300 may include, for example: associating a first virtual sound source 214*a* with a first physical location L1 in an environment in which the user 200 is located (step 402); identifying one or more acoustically reflective surfaces (216*a*-216*f*) at a second physical location L2 in the environment (step 404); generating a first left Head Related Transfer Function 204L,205L (HRTF) and a first right HTRF 204R,205R arranged to simulate the first direct sound 218 to the left ear of the user and right ear of the user 200, respectively, or to simulate the first primary reflected sound 220 to the left ear of the user and the right ear of the user, respectively; simulating either a first direct sound 218 from the first virtual audio source 214*a* or a first primary reflected sound 220 from the first virtual audio source 214*a* off of a first reflective surface 216*a* of the one or more reflective surfaces within the environment, wherein the simulated first direct sound 218 or the simulated first primary reflected sound 220 from the first virtual sound source includes a first directional characteristic (208) (step 408); generating a second left Head Related Transfer Function 206L (HRTF) and a second right HTRF 206R, arranged to simulate the first secondary reflected sound 227 to the left ear of the user and right ear of the user, respectively (410); simulating a first secondary reflected sound 227 off of a second reflective surface 216*b* of the one or more reflective surfaces (step 412). Method 400 may further include, for example: associating a second virtual sound source 214*b* with a third physical location L3 in the environment (414); generating a third left Head Related Transfer Function (HRTF) 204L,205L and a third right HTRF 204R,205R, arranged to simulate the second direct sound 219 to the left ear of the user and right ear of the user, respectively, or to simulate the second primary reflected sound 221 to the left ear of the user and the right ear of the user, respectively (step 416); simulating either a second direct sound 219 from the second virtual audio source 214*b* or a second primary reflected sound 221 from the second virtual audio source 214*b* off of the first reflective surface 216*a* of the one or more reflective surfaces within the environment, wherein the simulated second direct sound 219 or the simulated second primary reflected sound 221 from the second virtual sound source 214*b* includes a second directional characteristic (208) (step 418); generating a fourth left Head Related Transfer Function (HRTF) 206L and a fourth right HTRF 206R, arranged to simulate the second secondary reflected sound 229 to the left ear of the user and right ear of the user, respectively (step 420); and simulating a second secondary reflected sound 229 off of the second reflective surface 216*b* of the one or more reflective surfaces (step 422).

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as “only one of” or “exactly one of,” or, when used in the claims, “consisting of,” will refer to the inclusion of exactly one element of a number or list of elements. In general, the term “or” as used herein shall only be interpreted as indicating exclusive alternatives (i.e. “one or the other but not both”) when preceded by terms of exclusivity, such as “either,” “one of,” “only one of” or “exactly one of.”

As used herein in the specification and in the claims, the phrase “at least one,” in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase “at least one” refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as “comprising,” “including,” “carrying,” “having,” “containing,” “involving,” “holding,” “composed of,” and the like are to be understood to be open-ended, i.e., to mean including but not limited to. Only the transitional phrases “consisting of” and “consisting essentially of” shall be closed or semi-closed transitional phrases, respectively.

The above-described examples of the described subject matter can be implemented in any of numerous ways. For example, some aspects may be implemented using hardware, software or a combination thereof. When any aspect is implemented at least in part in software, the software code can be executed on any suitable processor or collection of processors, whether provided in a single device or computer or distributed among multiple devices/computers.

The present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the “C” programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function (s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant may be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The invention claimed is:

1. A method for virtualizing sound from a speaker assembly proximate to a user, comprising:

receiving an audio signal associated with a first virtual sound source;

receiving a virtual sound source location of the first virtual sound source;

receiving a virtual sound source orientation of the first virtual sound source;

adjusting the audio signal based at least in part on a radiation pattern characteristic of the first virtual sound source;

adjusting the audio signal based at least in part on an acoustically reflective characteristic of an acoustically reflective surface in proximity to the first virtual sound source, wherein the radiation pattern characteristic includes a reflected directional characteristic based at least in part on a mirror sound source location selected based at least in part on the first virtual sound source location and a location of the acoustically reflective surface;

adjusting the audio signal based at least in part on a head related transfer function (HRTF); and providing the adjusted audio signal at an output, the output adjusted audio signal to be provided to the speaker assembly for conversion into acoustic energy delivered to at least one of the user's ears.

2. The method of claim 1, wherein the acoustically reflective characteristic is frequency dependent.

3. The method of claim 1, wherein the radiation pattern characteristic includes a directional characteristic.

4. The method of claim 3, wherein the directional characteristic is frequency dependent.

5. The method of claim 1, further comprising:

receiving a second audio signal associated with a second virtual sound source;

receiving a second virtual sound source location of the second virtual sound source;

receiving a second virtual sound source orientation of the second virtual sound source;

adjusting the second audio signal based at least in part on a second radiation pattern characteristic of the second virtual sound source;

adjusting the second audio signal based at least in part on a head related transfer function (HRTF);

providing the second adjusted audio signal at the output, the second output adjusted audio signal to be provided to the speaker assembly for conversion into acoustic energy delivered to at least one of the user's ears.

6. The method of claim 5, wherein the first virtual sound source is a first speaker of a surround sound system and the second virtual sound source is a second speaker of the surround sound system.

7. The method of claim 6, wherein the first virtual sound source is a treble speaker and the second virtual sound source is a bass speaker.

8. A binaural sound virtualization system, comprising:

a memory;

a processor coupled to the memory and configured to:

receive an audio signal, receive location information about a virtual sound source, receive orientation information about the virtual sound source, process the audio signal into a left signal and a right signal, each of the left signal and the right signal configured to cause a user to perceive the audio signal as virtually coming from the virtual sound source located and oriented in accord with the location information and the orientation information, upon acoustically rendering the left signal to the user's left ear and the right signal to the user's right ear; and an output coupled to the processor and configured to provide the left signal and the right signal to an audio rendering device, wherein the processing of the audio signal causes a user to perceive the audio signal as virtually coming from the virtual sound source located and oriented in accord with the location information and the orientation information and includes applying a radiation pattern associated with the orientation information, and wherein the radiation pattern includes a reflected directional characteristic based at least in part on a mirror sound source location selected based at least in part on the first virtual sound source location and a location of an acoustically reflective surface in proximity to the first virtual sound source.

9. The binaural sound externalization system of claim 8, wherein the acoustically reflective surfaces is selected from: a wall, a floor, or a ceiling within the environment.

10. The binaural sound virtualization system of claim 8, further comprising a display configured to display an avatar representing the virtual sound source, wherein the display is arranged on a smartphone or other mobile computing device.

11. The binaural sound virtualization system of claim 8 further comprising a motion tracker configured to collect data related to an orientation of the user.

12. The binaural sound virtualization system of claim 8, wherein the processor is further configured to:

receive a second audio signal, receive second location information about a second virtual sound source, receive second orientation information about the second virtual sound source, and process the second audio signal into a second left signal and a second right signal, each of the second left signal and the second right signal configured to cause a user to perceive the second audio signal as virtually coming from the second virtual sound source located and oriented in accord with the second location information and the second orientation information, upon acoustically rendering the second left signal to the user's left ear and the second right signal to the user's right ear.

13. The binaural sound virtualization system of claim 12, wherein the virtual sound source is a first speaker of a surround sound system and the second virtual sound source is a second speaker of the surround sound system.

14. The binaural sound virtualization system of claim 13, wherein the virtual sound source is a treble speaker and the second virtual sound source is a bass speaker.

15. A binaural sound virtualization system, comprising:

an input to receive an audio signal;

a first output to provide a first output signal to be acoustically rendered to a user's left ear;

a second output to provide a second output signal to be acoustically rendered to a user's right ear; and a processor coupled to the input, the first output, and the second output, the processor configured to receive the audio signal and adjust the audio signal to generate each of the first output signal and the second output signal to virtualize the audio signal to be perceived as coming from a virtual sound source, the processor further configured to account for a radiation pattern of the virtual sound source in adjusting the audio signal to generate each of the first output signal and the second output signal, wherein the processor is further configured to account for an acoustically reflective characteristic of an acoustically reflective surface in proximity to the first virtual sound source, and wherein the radiation pattern includes a reflected directional characteristic based at least in part on a mirror sound source location selected based at least in part on the first virtual sound source location and a location of the acoustically reflective surface.

16. The binaural sound virtualization system of claim 15, wherein the processor is further configured to:

receive a second audio signal, receive second location information about a second virtual sound source, receive second orientation information about the second virtual sound source, and process the second audio signal into a second left signal and a second right signal, each of the second left signal and the second right signal configured to cause a user to perceive the second audio signal as virtually coming from the second virtual sound source located and oriented in accord with the second location information and the second orientation information, upon acoustically rendering the second left signal to the user's left ear and the second right signal to the user's right ear;

wherein the virtual sound source is a treble speaker and the second virtual sound source is a bass speaker.

* * * * *